United States Patent
Lee et al.

(10) Patent No.: US 8,046,039 B2
(45) Date of Patent: Oct. 25, 2011

(54) MOBILE TERMINAL AND CASE FOR MOBILE TERMINAL

(75) Inventors: Min-Soo Lee, Seoul (KR); Tai-Woo Kim, Seoul (KR); Seung-Woo Park, Seoul (KR); Woo-Young Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 853 days.

(21) Appl. No.: 11/874,787

(22) Filed: Oct. 18, 2007

(65) Prior Publication Data

US 2008/0096620 A1    Apr. 24, 2008

(30) Foreign Application Priority Data

Oct. 20, 2006    (KR) .................. 10-2006-0102555
Nov. 15, 2006   (KR) .................. 10-2006-0112736

(51) Int. Cl.
*H04W 88/02*    (2009.01)
(52) U.S. Cl. .................................................. 455/575.8
(58) Field of Classification Search .................. 455/418, 455/412.2, 517, 556.1, 575.8, 577, 575.1, 455/575.4; 340/539.3; 715/716, 764, 769, 715/852; 345/169, 173; 370/338, 493; 701/200; 711/171; 257/66; 355/69, 72; 438/151, 438/161; 427/62
See application file for complete search history.

(56) References Cited

U.S. PATENT DOCUMENTS

| | | | |
|---|---|---|---|
| 5,983,290 A * | 11/1999 | Obata et al. ................ 710/38 |
| 6,444,507 B1 * | 9/2002 | Miyasaka .................. 438/164 |
| 7,515,930 B2 * | 4/2009 | Eromaki .................. 455/550.1 |
| 7,647,081 B2 * | 1/2010 | Maatta .................... 455/575.4 |
| 2003/0005851 A1 * | 1/2003 | Post ......................... 104/281 |
| 2004/0049743 A1 * | 3/2004 | Bogward ................. 715/531 |
| 2005/0017953 A1 * | 1/2005 | Pekka ...................... 345/169 |
| 2005/0079902 A1 * | 4/2005 | Chen et al. ............. 455/575.4 |
| 2005/0084121 A1 * | 4/2005 | Muren et al. ............ 381/171 |
| 2006/0258302 A1 * | 11/2006 | Ding et al. ............... 455/90.3 |
| 2009/0005133 A1 * | 1/2009 | Takahashi ............. 455/575.3 |

* cited by examiner

*Primary Examiner* — Diane Mizrahi
(74) *Attorney, Agent, or Firm* — Birch, Stewart, Kolasch & Birch, LLP

(57) ABSTRACT

A case of a mobile terminal includes a user input unit, a controller for manipulating an input signal, an interface for transmitting the manipulated input signal and protects a mobile terminal. As the case of the mobile terminal provides an additional user input, this allows a user to control each function of the mobile terminal with user friendly manner, or to input data efficiently, and to improve a design quality of the mobile terminal.

11 Claims, 20 Drawing Sheets

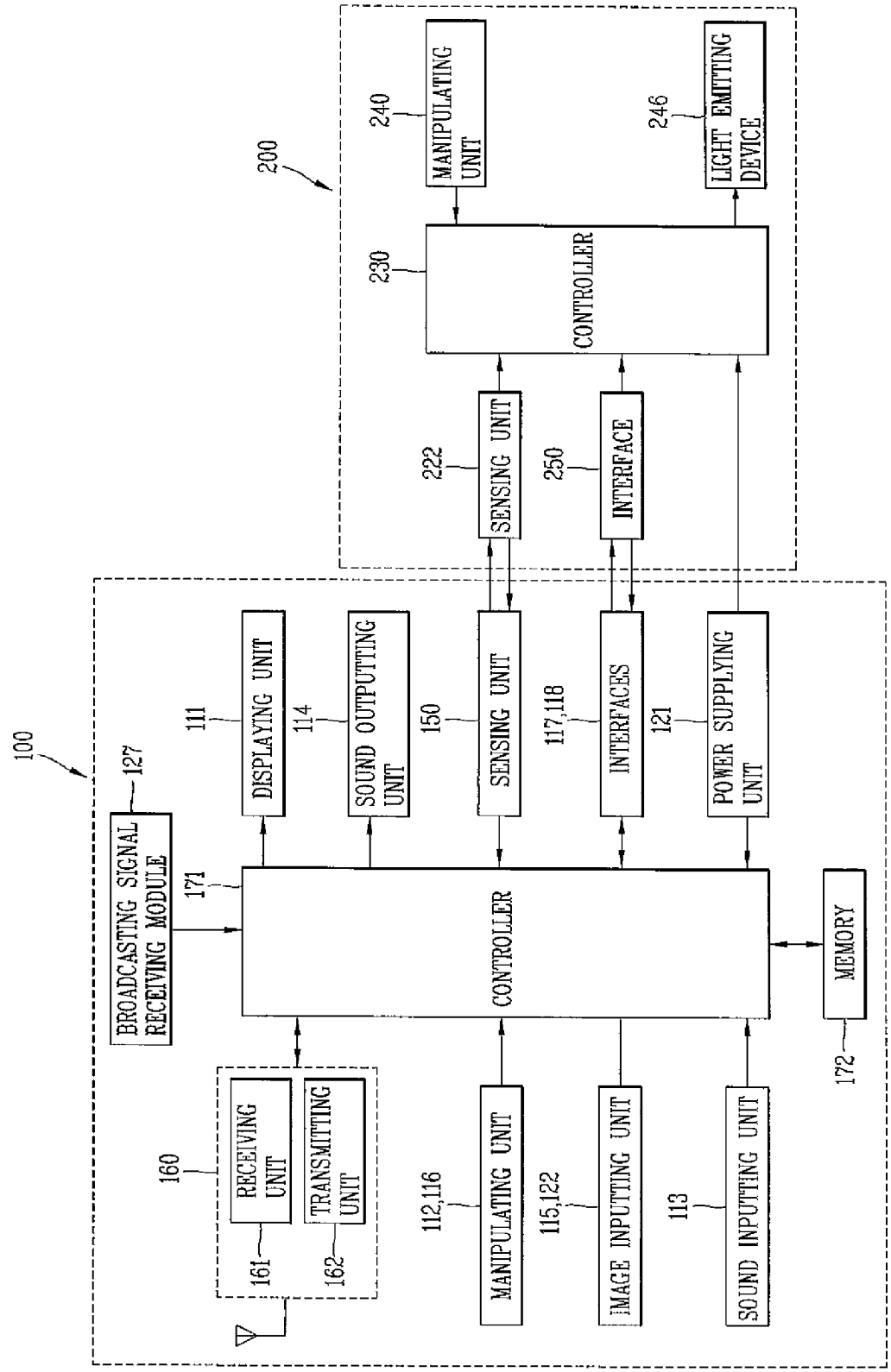

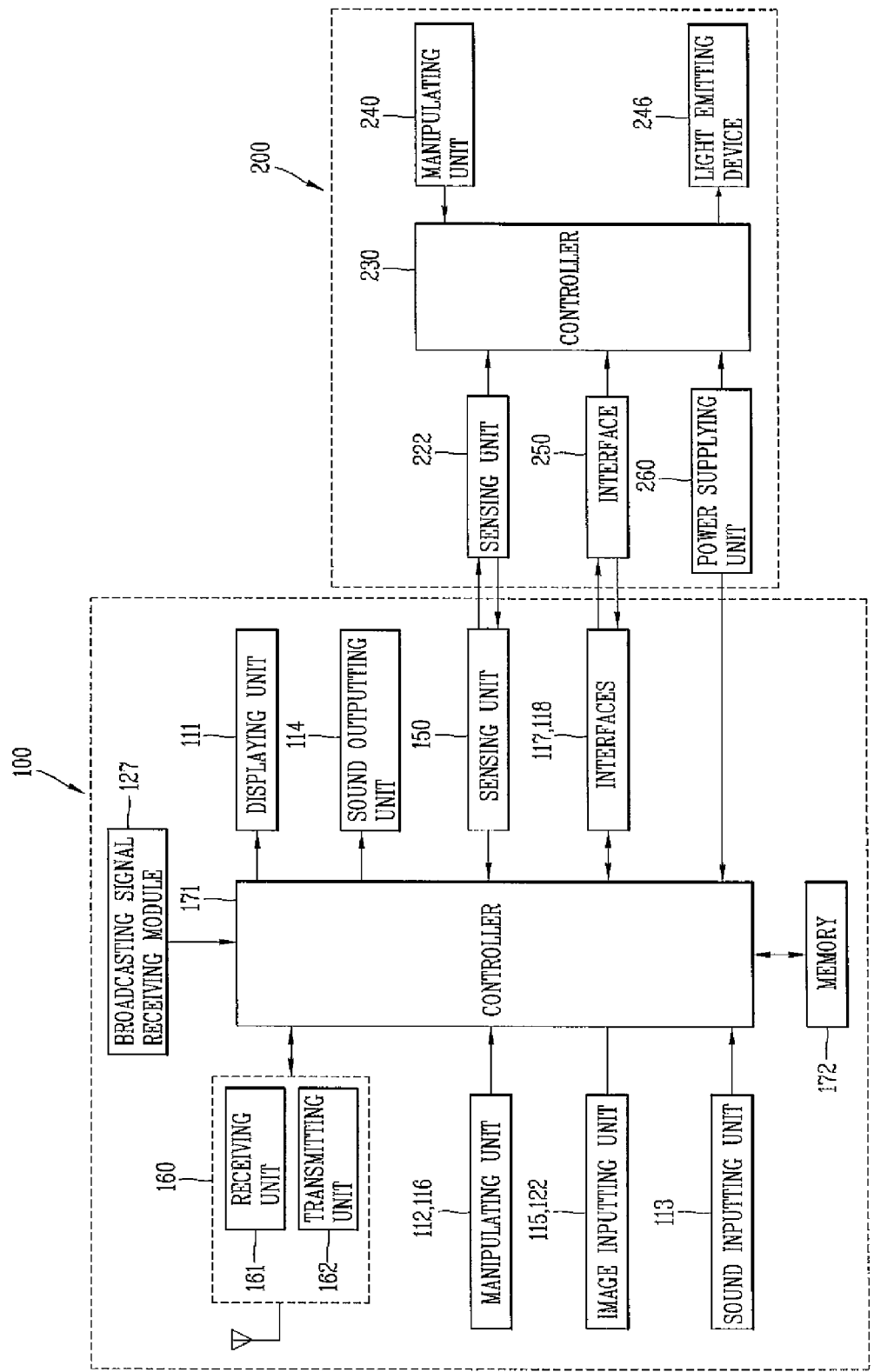

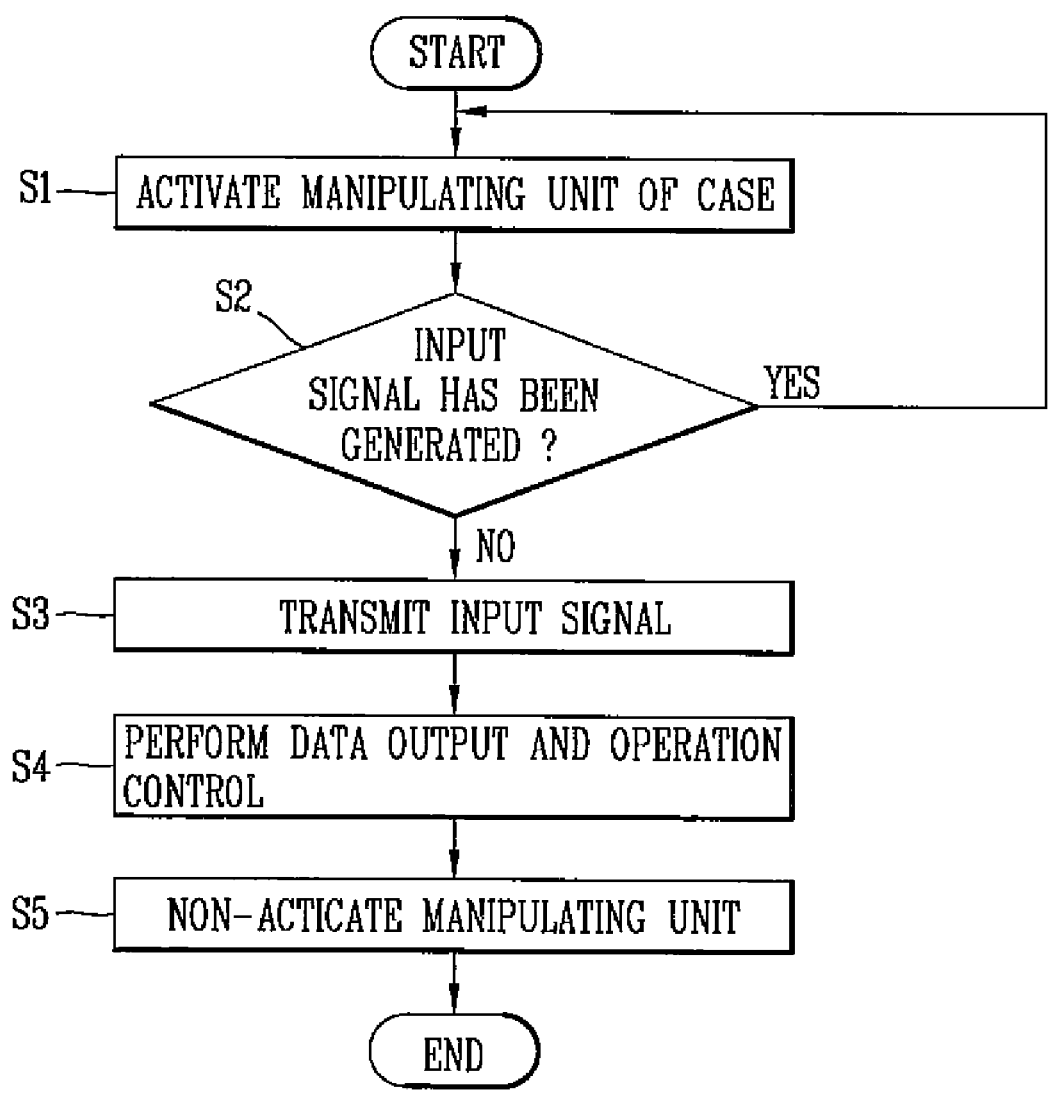

MOBILE TERMINAL AND CASE FOR MOBILE TERMINAL

RELATED APPLICATION

The present invention relates to subject matter contained in priority Korean Application No. 10-2006-0102555, filed on Oct. 20, 2006, and Korean Application No. 10-2006-0112736, filed on Nov. 15, 2006 which is herein expressly incorporated by reference in its entirety.

RELATED ART OF THE INVENTION

1. Field of the Invention

The present invention relates to a mobile terminal having a case, and more particularly, to a case for a mobile terminal has a user input unit (manipulating unit) for data input and/or an operation control.

2. Description of the Related Art

Generally, a mobile terminal is a portable device having one or more functions among a call function, a video call function, an information input/output function, and a data storage function. As the mobile terminal has various functions, complicated functions such as a function for capturing a still image or a moving image, a function for reproducing a music file or a moving image, a game function, and a function for receiving broadcasting data may also be provided at the mobile terminal. As such, the mobile terminal has been implemented as a multimedia player.

According to the conventional mobile terminal, various researches have been performed in a hardware or software aspect so as to implement complicated functions, stable configurations, and easy operation and/or to enhance a user's convenience. For instance, a user's interface for allowing a user to easily and conveniently search or select a function has been developed and provided. Also, as the mobile terminal is considered as a personal belonging to represent a user's characteristic or personality, various designs of the mobile terminal have been provided to the user.

Accordingly, a research for facilitating an application (or an implementation) of a displaying means according to the mobile terminal is required. Also, a research for conveniently applying inputting/outputting means for implementing various functions of the mobile terminal is required. Furthermore, a research for implementing a simple structure even if the mobile terminal has various functions is required. A research for facilitating an operation of the mobile terminal that becomes smaller in size is required.

Generally, an appearance of the mobile terminal is exposed to an external environment without being protected. Furthermore, since a user input unit (i.e., keypad) or output unit (i.e. screen) of the mobile terminal is exposed to the external environment without being protected, a research for protecting these units and the appearance of the mobile terminal is also required.

As the mobile terminal becomes small in size, it is difficult to design a user input unit (or manipulating unit) for controlling each function of the mobile terminal or inputting data to have a sufficient size and space. Accordingly, a research to solve the problems is required.

Since the mobile terminal becomes small in size, it is difficult to design the mobile terminal to have a displaying unit large enough to conveniently implement various functions.

SUMMARY

One aspect of the present invention involves the recognition by the present inventors of the drawbacks in the related art, as explained above. Based upon such recognition, the following features have been conceived.

One aspect of the present invention is to provide a mobile terminal capable of sufficiently obtaining a region or space of a user input unit (or manipulating unit) for inputting data and/or controlling an operation of the mobile terminal, and a region or size of a displaying unit.

Another aspect of the present invention is to provide a mobile terminal capable of protecting an appearance of the mobile terminal and a user input unit thereof.

Still another aspect of the present invention is to provide a mobile terminal capable of arranging keys on a user input unit so that data can be conveniently inputted in various manners.

Still another aspect of the present invention is to provide a mobile terminal with a smaller or slimmer size while a displaying unit and a user input unit of the mobile terminal have a wide region, respectively.

Still another aspect of the present invention is to provide a mobile terminal capable of sufficiently obtaining a usage time in various manners.

To achieve at least the above aspects, there is provided a mobile terminal having a case and a method for controlling the same.

In an embodiment of a mobile terminal, a case having a user input unit (or manipulating unit) may be detachably coupled to a body of the mobile terminal. The user input unit of the case may be configured to perform signal transmission/reception (hereinafter, will be referred to as 'transception') with a controller of the body.

The case coupled to the body of the mobile terminal may be configured to be foldable so as to cover the body for protection. A controller for processing an input signal generated by the user input unit (or manipulating unit) may be further provided at the case. The case and the body may be respectively provided with an interface to transmit/receive (hereinafter, will be referred to as 'transceiver') a signal with each other. Power may be supplied to the case through the first interface for signal transception or a contacting unit. A sensing unit may be further provided at the case. The manipulating unit provided at the case may be implemented in a qwerty manner. The manipulating unit may be further provided with a light emitting device.

In another embodiment of a mobile terminal, a body having a second interface and a controller is detachably coupled to a case having a controller for converting a signal generated by a manipulating unit and an interface for transmitting a converted signal. Accordingly, the body may be operated according to a signal generated by the manipulating unit of the case, or may control output information.

A sensing unit for controlling on/off of the interface may be further provided. A power supplying unit may be further provided at the case.

In still another embodiment of a mobile terminal, a body having an interface and a controller is detachably coupled to a case having a controller for converting a signal generated by a manipulating unit and an interface for transmitting a converted signal. Accordingly, the body may be operated according to a signal generated by the manipulating unit of the case, or the converted signal may control output information. Power may be supplied from a power supplying unit of the body and/or the case.

The power that provided to the body and case may be supplied or controlled by one of controllers of the body or case. The power supplying unit of the body may be charged by the power supplying unit of the case.

According to an embodiment, a method for controlling a mobile terminal may comprise activating a manipulating unit (or user input unit) provided at a case for data input; transmitting an input signal generated by the manipulating unit to a controller provided at a body; controlling an operation and/or an output of the mobile terminal by the transmitted signal; and non-activating the manipulating unit.

The manipulating unit may be activated or non-activated by each sensing unit provided at the case and the body.

The input signal may be transmitted to the mobile terminal through interfaces provided at the case and the body. The input signal generated by the manipulating unit may be transmitted to the mobile terminal by a controller provided at the case. An operation or an output of the mobile terminal may be controlled by the controller of the body.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 10B is a block diagram showing a mobile terminal having the case according to a second embodiment of the present invention;

FIG. 10C is a block diagram showing a mobile terminal having the case according to a third embodiment of the present invention; and FIG. 11 is a flowchart showing a method for controlling a mobile terminal according to a first embodiment of the present invention.

DETAILED DESCRIPTION

Figure 1A:
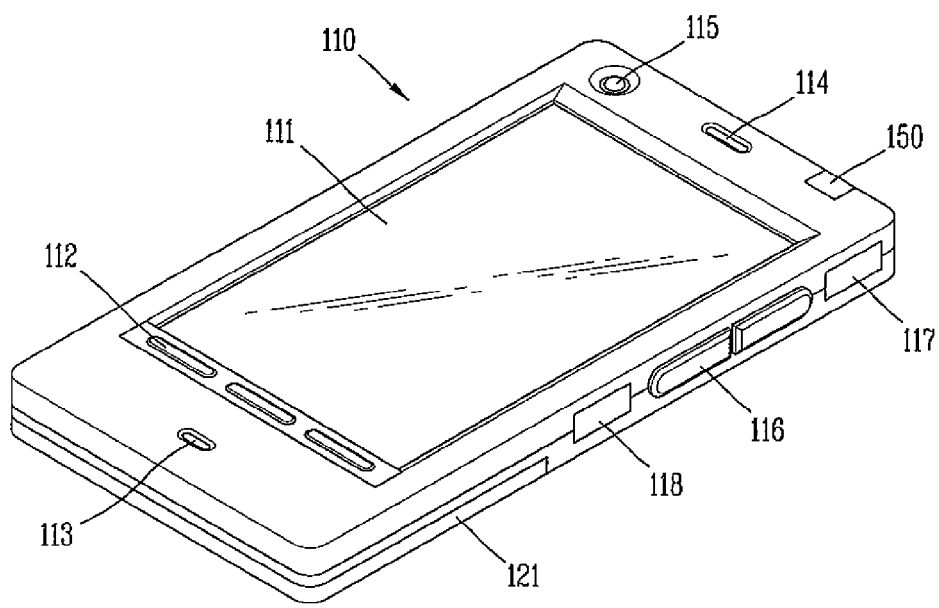
FIG. 1A is a front perspective view showing a mobile terminal having a displaying unit according to a first embodiment of the present invention.

Reference will now be made in detail to the preferred embodiments of the present invention, examples of which are illustrated in the accompanying drawings.

The same components of each embodiment of the present invention were provided with the same reference numerals or extended numerals for convenience.

Figure 1B:
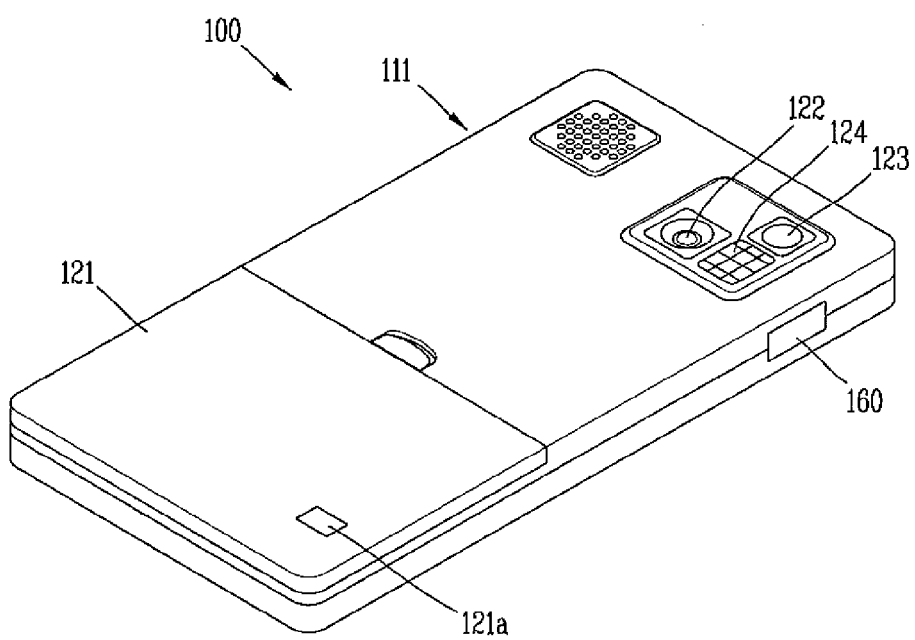
FIG. 1B is a rear perspective view showing the mobile terminal of FIG. 1A.

FIGS. 1A and 1B respectively show a bar-type mobile terminal according to a first embodiment of the present invention.

Hereinafter, each embodiment of the present invention will be explained based upon a configuration that the bar-type mobile terminal is coupled to a case, and a signal generated by a manipulating unit is transceived. However, it can be understood that various types of mobile terminal may be implemented according to the present invention. Examples may include a folder type, a sliding type, etc. A configuration of the mobile terminal 100 will be explained.

The mobile terminal 100 may be operated in a waiting mode (or standby mode) before being manipulated or controlled by a user. The waiting mode may be released by the user's manual operation. The mobile terminal 100 is mainly in an operation mode for a data input (or a bi-directional communication or a data input for performing each function mounted therein, etc.). The operation mode of the mobile terminal may be changed into a waiting mode by a user's manual operation or by a lapse of time.

Each component for performing an operation by software or a mechanical operation may be mounted in a body 110 of the mobile terminal 100. The body 110 may include a front case and a rear case. The body may additionally include one or more middle cases between the front case and the rear case.

The cases may be injection-molded by using a synthetic resin, or may be formed of a metallic material such as stainless steel, titanium, etc.

As shown in FIGS. 1A and 1B, a displaying unit 111 may be provided at one side of the body 110. The displaying unit 111 may be implemented by using various types of displays. Examples may include a liquid crystal display (LCD) module, an organic light emitting diodes (OLED) module, an organic electro-luminescence (EL) module, a light emitting diode (LED) module, plasma display screens, etc, so as to visually output information (data). The displaying unit 111 may be configured so as to perform a data input as well as a data output.

The data input includes a data search, a menu search, a signal generation for a function control, a data input for communication, etc. The displaying unit 111 may be implemented as a touch screen so as to perform the data input. The displaying unit 111 may be implemented as a means to generate a signal by a user's touch (or a press) or a stylus.

The mobile terminal 100 may be provided with a manipulating unit (or user input unit) at one or more bodies. The manipulating unit may be implemented as a plurality of manipulating units 112 and 116. In the preferred embodiment, first manipulating units 112 and second manipulating units 116 are provided as for illustration purpose only.

As shown in FIG. 1A, the first manipulating units 112 may be provided at a front surface of the body 110, and the second manipulating units 116 may be provided at a side surface of the body 110.

The manipulating units 112 and 116 may be configured so as to input numbers, letters, characters, etc. Some of the manipulating units 112 and 116 may be operated to input a starting command, an ending command and a scroll, or may be operated as hot-keys to perform a specific function. Some of the manipulating units 112 and 116 may be implemented as a touch pad or a dome switch that can receive information inputted by a user's manual operation. Also, a part of the manipulating units 112 and 116 may be implemented as a key rotating wheel, or may be implemented by combining a jog method and a handling method for a joy stick to each other.

The body 110 may further include a sound outputting unit 114. The sound outputting unit 114 may be implemented as a receiver or a speaker.

The body 110 may further include a sound inputting unit 113. As one example, the sound inputting unit 113 may be implemented as a microphone for inputting a user's voice or other sound.

A power supplying unit 121 for supplying power to the mobile terminal 100 may be provided at another side of the body 110 where the first manipulating units are not disposed. As one example, the power supplying unit 121 may be implemented as a detachable battery for charging. Here, various types of battery can be used as well.

The body 110 may further include a first image inputting unit 115. The first image inputting unit 115 may be implemented as a camera module for capturing a user's image or a moving image. Here, a flash may be further provided at a position near the first image inputting unit 115.

Second interfaces 117 and 118 may be further provided at the body 110 (e.g., positions near the second manipulating units). The second interfaces 117 and 118 may be implemented as passages for enabling the mobile terminal 100 to perform a data exchange (e.g., a communication) with an external device. As one example, the second interfaces 117 and 118 may be configured so as to perform a data exchange by wire or wireless.

The second interfaces 117 and 118 may be implemented as at least one of a connecting port to be connected with an ear phone, a port for a near-distance communication (e.g., an IrDA port), a Bluetooth port, a wireless LAN port, or power supply ports for supplying power to the mobile terminal 100. The second interfaces 117 and 118 may be also implemented as a subscriber identification module (SIM), a user identity module (UIM), a universal subscriber identity module (USIM) or a card socket for receiving an external card such as a memory card for storing information.

The body 110 may be further provided with a second image inputting unit 122. The second image inputting unit 122 may have an opposite image-capturing direction to the first image inputting unit 115. The second image inputting unit 122 may be implemented as a camera having a different pixel from the first image inputting unit 115. For instance, one of the first image inputting unit 115 and the second image inputting unit 122 may be configured to capture an object with a low pixel so that a user's face captured during a video call can be directly transmitted to another party. Another of the first image inputting unit 115 and the second image inputting unit 122 may be configured to capture an object with a high pixel so that a captured image is not to be directly transmitted to another party.

When the second image inputting unit 122 is provided at the body 120, a flash 123 and a mirror 124 may be provided at positions adjacent to the second image inputting unit 122. When the second image inputting unit 122 is to capture an object, the flash 123 provides light to the object. When a user is to capture his or her own image by using the second image inputting unit 122, the user reflects himself or herself onto the mirror 124.

A sound outputting unit 125 may be further provided at the body 110. The sound outputting unit 125 may perform a stereo function together with the sound outputting unit 114 provided at the body 110.

Not only an antenna for performing a calling, but also an antenna for receiving a broadcasting signal 160 may be further provided at the body 110. The antenna for receiving a broadcasting signal 160 may be mounted in the body 110.

As shown in FIG. 2A through 2E, the body 110 may be detachably coupled to the case 200. In order to detachably couple the body 110 to the case 200, a first body 210 of the case 200 may include a first fixing portion 211 and a second fixing portion 212. The first and second fixing portions 211 and 212 may be provided at upper and lower ends of the first body 210 of the case 200 so that upper and lower ends of the body 110 can be fixed. Here, the first body 210 is formed of an elastic material so that both ends of the body 110 can be firmly or tightly coupled to the first and second fixing portions 211 and 212.

The first fixing portion 211 may have a hole 213 through which the sound outputting unit 114 of the body 110 is exposed out.

When the body 110 is provided with the second image inputting unit 122, an opening 214 may be formed at the first body 210 so as to expose out the second image inputting unit 122 for capturing an image.

The case 200 may include a first body 210 to which the body 110 is coupled, and a second body 220 for covering one surface (e.g., a front surface) of the body 110. A manipulating unit 240 may be formed at one side of the case 200. A first interface 250 for controlling an operation of the mobile terminal 100 by the manipulating unit 240 by transceiving a signal with the body 110 may be provided at the case 200.

The first interface 250 is disposed at the case 200 in correspondence to the second interface 118 disposed at the body 110. The first and second interfaces 118 and 250 enable a signal transmission between the body 110 and the manipulating unit 240 of the case 200. The first and second interfaces 118 and 250 may be implemented as connectors serving as connecting means. The first and second interfaces 118 and 250 may be also configured so as to implement an optical communication (e.g., infrared rays communication) or near distance communication (e.g., Bluetooth).

Figure 2A:
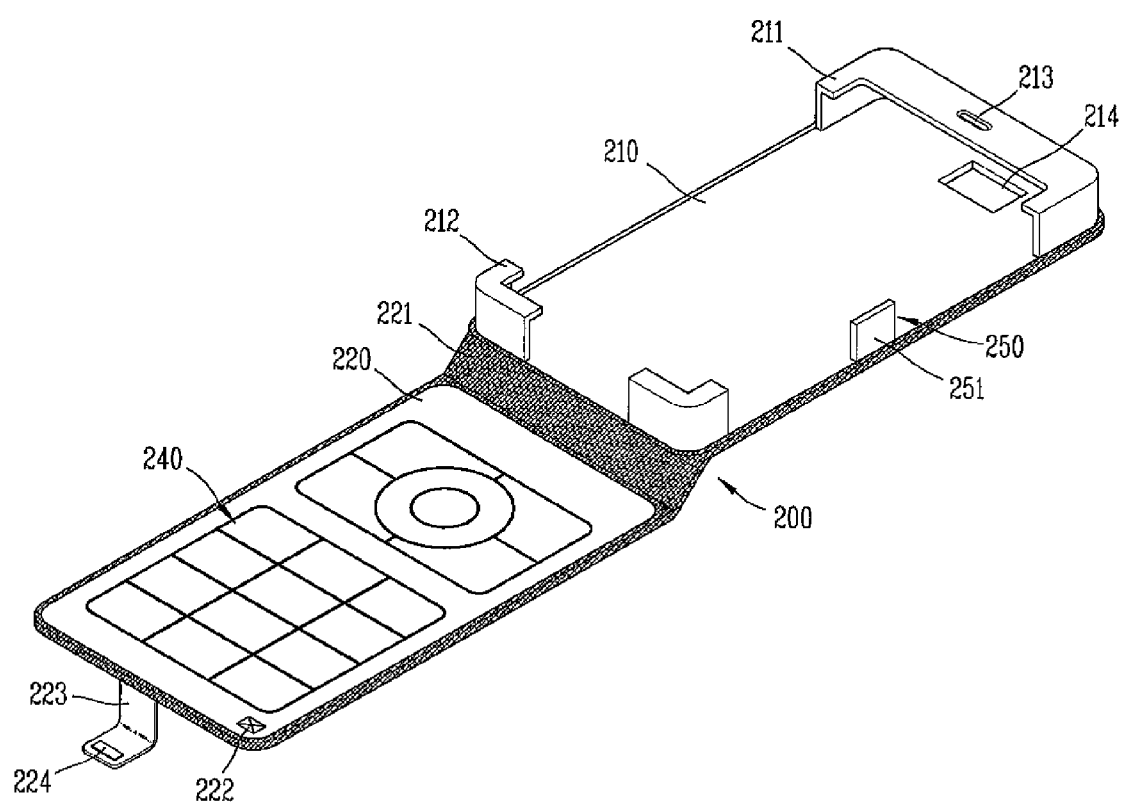
FIG. 2A is a perspective view showing a case to which the mobile terminal is coupled according to a first embodiment of the present invention.
Figure 3A:
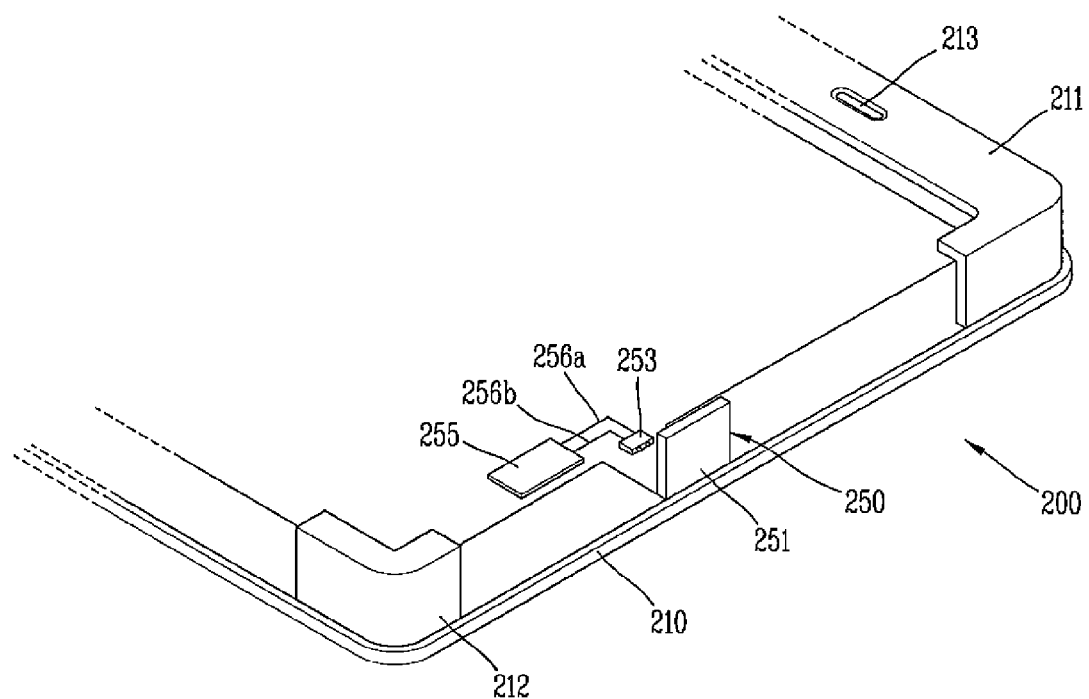
FIG. 3A is a view showing a first interface provided at the case according to a first embodiment of the present invention.

As shown in FIG. 2A, the first interface 250 is supported by a supporting unit 251. The first interface 250 may be configured so as to implement an optical communication, which will be explained with reference to FIG. 3A.

A circuit board 241 on which the manipulating unit 240 is arranged is disposed in the case 200. The first interface 250 may be disposed at one side of the circuit board 241, or may be connected to the circuit board 241. The first interface 250 may include a sensing unit 253 having a light emitting device 253a and a light receiving device 253b. The light emitting device 253a and the light receiving device 253b may be directly communicated with the second interface 118 provided at the body 110. For instance, the light emitting device 253a and the light receiving device 253b may be provided at the supporting unit 251.

A signal transmitting unit (e.g., a reflector, an optical fiber, etc.) is provide at the supporting unit 251 thus to be indirectly communicated with the second interface 118 provided at the body 110.

The second interface 118 of the body 110 may perform an optical communication (e.g., an infrared ray communication) with the first interface 250 provided at the case 200. The second interface 118 of the body 110 has the same configuration as the first interface 250 of the case 200, or may be configured so as to implement an optical communication of the mobile terminal 100. Accordingly, a detailed explanation of the second interface 118 will be omitted.

The sensing unit 253 having the light emitting device 253a and the light receiving device 253b may be connected to a signal processing module 255 by signal lines 256a and 256b. The signal processing module 255 may be provided at the circuit board 241 having the manipulating unit 240, or may be connected to the circuit board 241. A signal generated by the manipulating unit 240 is converted by the signal processing module 255, and then is transmitted to the second interface 118 provided at the body 110 through the sensing unit 253.

Figure 3B:
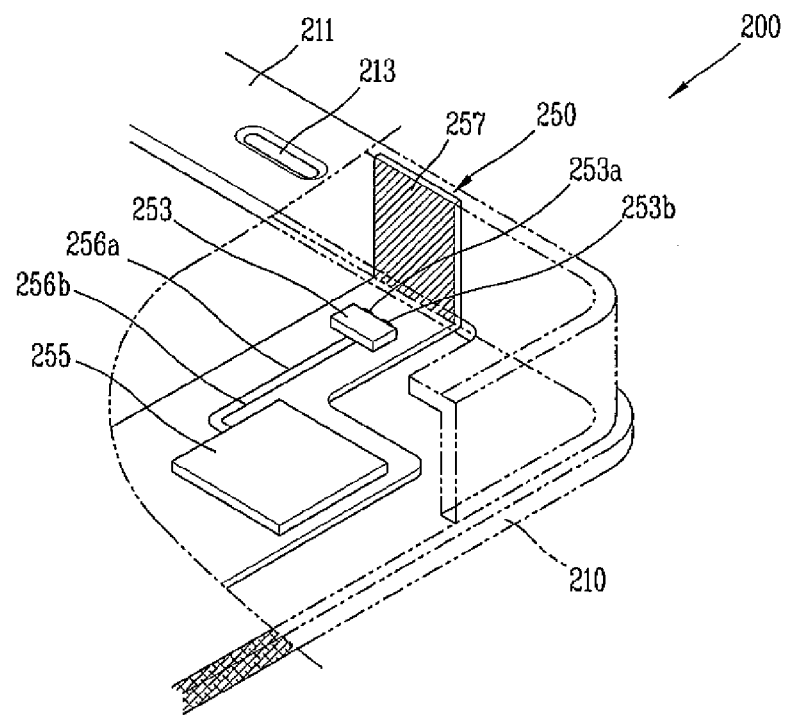
FIG. 3B is a view showing a first interface provided at another position of the case according to a first embodiment of the present invention.

As shown in FIG. 3B, the first interface 250 provided at the case 200 may be disposed at one side of the first fixing portion 211 without having the supporting unit 251. Here, a signal transmitting unit 257 may be further provided at one surface (an inner surface in drawing) of the first fixing portion 211.

The first interface 250 provided at the case 200, and the second interface 118 provided at the body 110 are implemented as connectors to transmit signals. Since the connector has a general configuration, its detailed explanation will be omitted. The interfaces 118 and 250 may be implemented by using a configuration of an antenna for the near distance communication. Since the interfaces 118 and 250 may be implemented to have a configuration of a general antenna, its detailed explanation will be omitted.

Figure 2B:
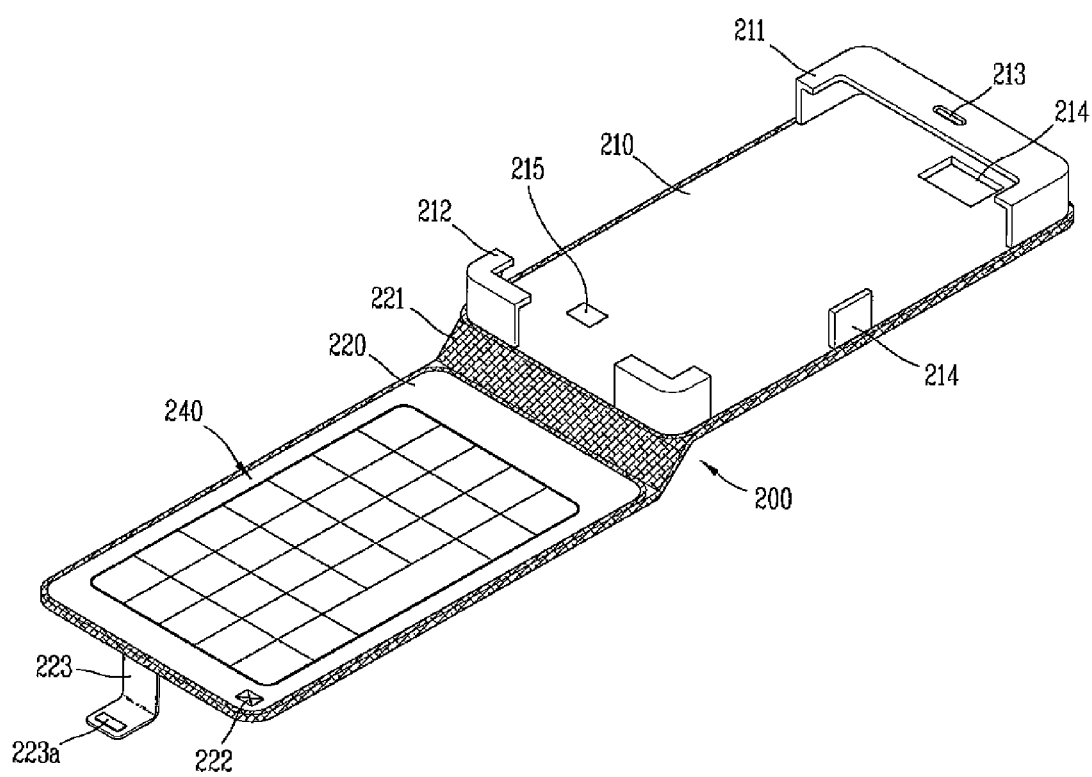
FIG. 2B is a perspective view showing a case to which the mobile terminal is coupled according to a second embodiment of the present invention.

FIG. 2B shows a state that a contacting unit 215 is provided at the first body 210 of the case 200. Here, the first interface 250 may be disposed at the first fixing portion 211 as shown in FIG. 3B.

Power is supplied from the power supplying unit 121 of the mobile terminal 100 to the case 200 through the contacting unit 215 so as to operate the manipulating unit 240 of the case 200. The contacting unit 215 may be connected to the circuit board 241 having the manipulating unit 240. The contacting unit 215 may be connected to the power supplying unit 121 of the mobile terminal 100, or may be connected to the body 110. When a charging port 121a is provided at the power supplying unit 121, the contacting unit 215 may be connected to the port 121a of the power supplying unit 121. On the contrary, when a charging port is not provided at the power supplying unit 121, the contacting unit 215 of the case 200 may be connected to a contacting unit of the power supplying unit 121 or the body 110.

Power supplied from the power supplying unit 121 of the body 110 to the case 200 serves to process a signal generated by the manipulating unit 240 of the case 200, and/or serves to perform a signal transmission between the interfaces 118 and 250. Since the contacting unit 215 may be implemented by using a configuration of a general connector or a connecting port, its detailed explanation will be omitted.

When the interfaces 118 and 250 are implemented as connectors serving as a power supplier, power is supplied to the mobile terminal 100 through the interfaces 118 and 250 without the contacting unit 215.

As aforementioned, the second body 220 may be provided at one end of the first body 210 so as to be foldable by a contacting unit 221. The manipulating unit 240 may be provided at the second body 220. The manipulating unit 240 may be configured so as to input numbers, letters, and/or characters like the manipulating unit 112 or 116 of the body 110. A part of the manipulating unit 240 may be configured to be operated as a hot-key for inputting a command such as a starting key, an ending key, and a scroll key, or for performing a specific function. A part of the manipulating unit 240 may be configured as a touch pad or a dome switch that can receive a command or information inputted by a stylus or by a user's push or touch. The manipulating unit 240 may be configured as a key-rotating wheel, or may be implemented by combining a jog method and a handling method for a joy stick to each other.

The manipulating unit 240 may be configured so that input keys for inputting data are arranged in a qwerty manner.

Figure 7A:
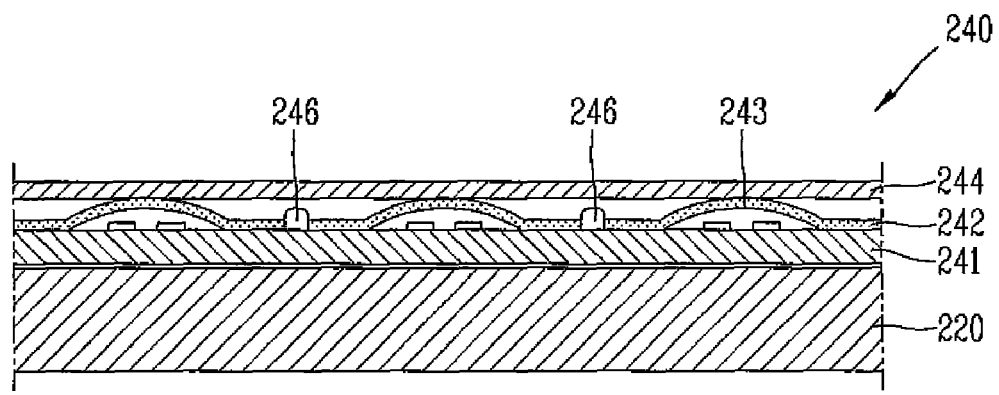
FIG. 7A is a view showing a section of a manipulating unit provided at the case according to a first embodiment of the present invention.
Figure 7B:
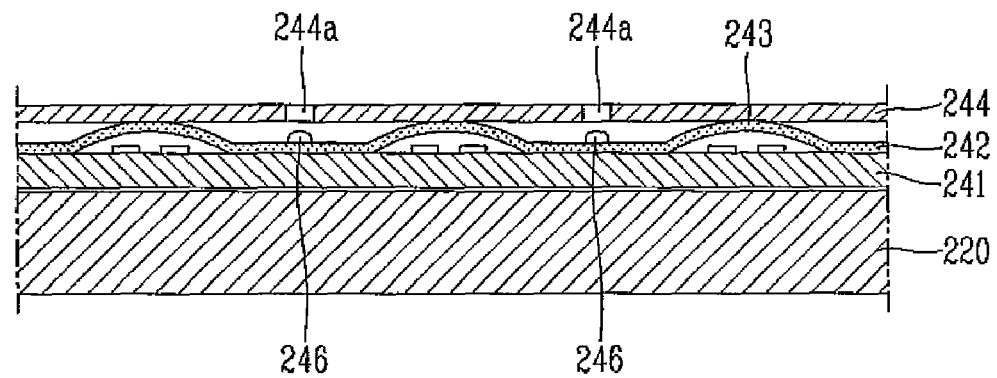
FIG. 7B is a view showing a section of a manipulating unit provided at the case according to a second embodiment of the present invention.

The manipulating unit 240 may have a configuration shown in FIGS. 7A and 7B. The manipulating unit 240 is formed of a key pad using a general dome-switch. A circuit board 241 that a plurality of switches 243 are disposed by an insulating sheet 242 may be disposed on one surface of the second body 220.

One or more light emitting devices 246 electrically connected to the circuit board 241 may be further provided at a position adjacent to the switch 243. A button portion 244 for manipulating each of the switches 243 is provided above the switches 243. The button portion 244 may be configured as one sheet as shown in FIG. 7A. As shown in FIG. 7B, the button portion 244 may be configured to have each individual region corresponding to each switch 243 by having dividing portions 244a.

Characters such as numbers or letters may be displayed on one surface of the button portion 244 exposed to outside. When the case 200 is closed, the button portion 244 contacts a front surface of the body 110 received in the first body 210. In order to prevent a scratch or an interference caused by a friction, the button portion 244 may be formed of an elastic material such as rubber. The button portion 244 may be formed of a plastic material having a thin thickness and a damping force.

The manipulating unit 240 was explained based on a pressure switch method. However, the manipulating unit 240 may be configured to be a variable resistance type or a capacitance type, or as a touch pad.

A locking member 223 for maintaining a closed state of the second body 220 with respect to the first body 210 may be further provided at one end of the second body 220. The locking member 223 may have a general locking structure (e.g., a locking structure provided at a handbag, etc.). The locking member 223 shown in FIG. 2A includes a body extending from an end of the second body 220 and contacting one end of the first body 210, and a coupling member 223a disposed at an end of the body. The coupling member 223a may be formed of a magnetic member, or may have various configurations such as a button or a Velcro. Another coupling member interacting with the coupling member 223a may be further provided at the first body 210 according to a configuration of the locking member 223.

When the body 110 is received in the case 200, the two bodies 210 and 220 of the case 200 maintain a closed state.

A sensing unit 222 may be further provided at the second body 220 of the case 200. The sensing unit 222 serves to sense an opened state of the two bodies 210 and 220 of the case 200.

A transceived state of a signal between the manipulating unit 240 of the case 200 and the body 110 can be controlled by sensing an opened state of the two bodies 210 and 220 of the case 200. For instance, the sensing unit 222 may convert each function of interfaces 118 and 250 for transmitting a signal between the manipulating unit 240 of the case 200 and the body 110 into an initializing function (or an activating function).

A sensing unit 150 interacting with the sensing unit 222 provided at the second body 220 of the case 200 may be further provided at the body 110. A transceived state of a signal between the manipulating unit 240 of the case 200 and the body 110 can be controlled by detecting an opened state of the two bodies 210 and 220 of the case 200 by an interaction between the sensing units 150 and 222.

The sensing units 150 and 222 may be implemented as well-known various sensing means such as a hole sensor and a proximity sensor.

The case 200 may be formed of a soft leather or a flexible plastic. The case 200 may be configured to protect the appearance of the body 110.

Figure 2C:
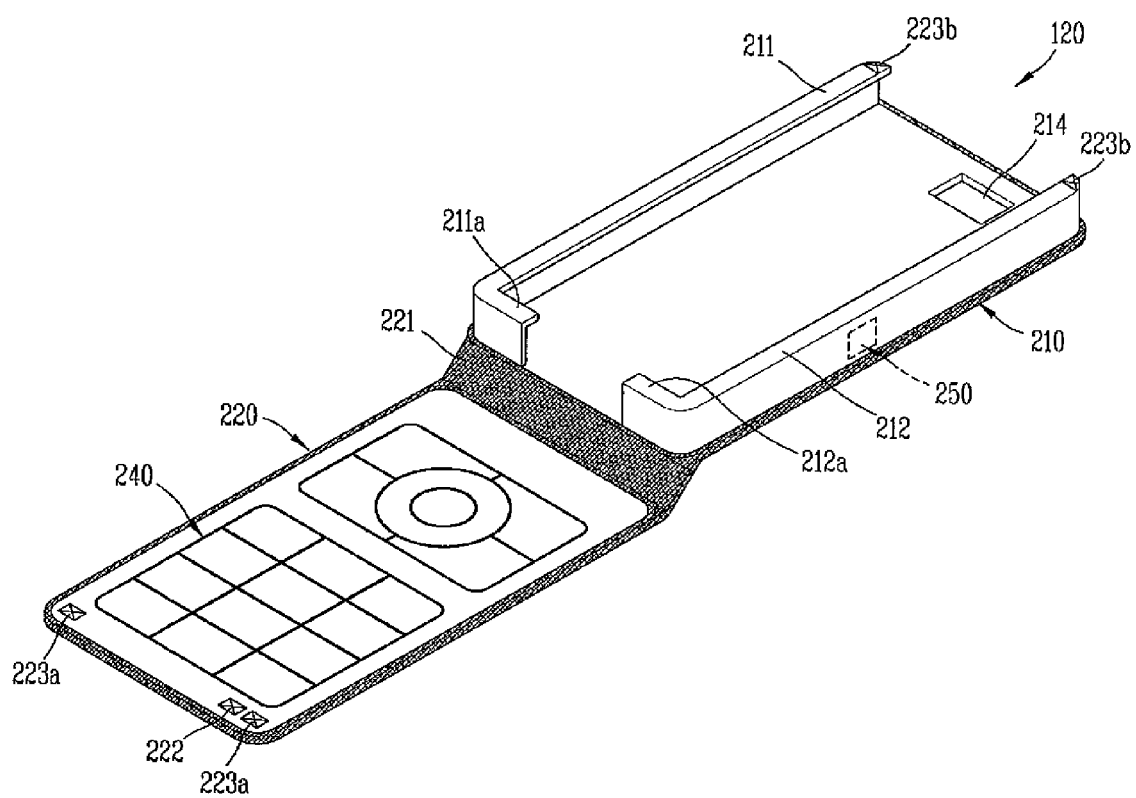
FIG. 2C is a perspective view showing a case to which the mobile terminal is coupled according to a third embodiment of the present invention.

As shown in FIG. 2C, the case 200 may include fixing units 211 and 212, and a locking member 223. The fixing units 211 and 212 may be disposed at both ends of the first body 210 in a longitudinal direction. The fixing units 211 and 212 may be provided with bending portions 211a and 212a at each one end, thereby inserting the body 110 in one direction and fixing the body 110. Accordingly, the body 110 can be more stably protected by an external impact or deformation by the case 200. Under the configuration, the body 110 and the case 200 can be more conveniently coupled to or separated from each other.

The first interface 250 may be disposed at one of the fixing units 211 and 212 in correspondence to the second interface 118 of the body 110. Here, the first interface 250 can be integrally formed with one of the fixing units 211 and 212, thereby requiring no additional supporting unit.

The coupling members 223a and 223b shown in FIG. 2C may be disposed at each corner of the bodies 210 and 220 of the case 200. The coupling members 223a and 223b may have a general locking structure. The coupling member 223a may be implemented as the sensing unit 222, or may be provided with an additional sensing unit.

Unexplained components of the case 200 in FIG. 2C have the same configuration as those in the aforementioned embodiment, and thus their detailed explanation will be omitted.

Figure 2D:
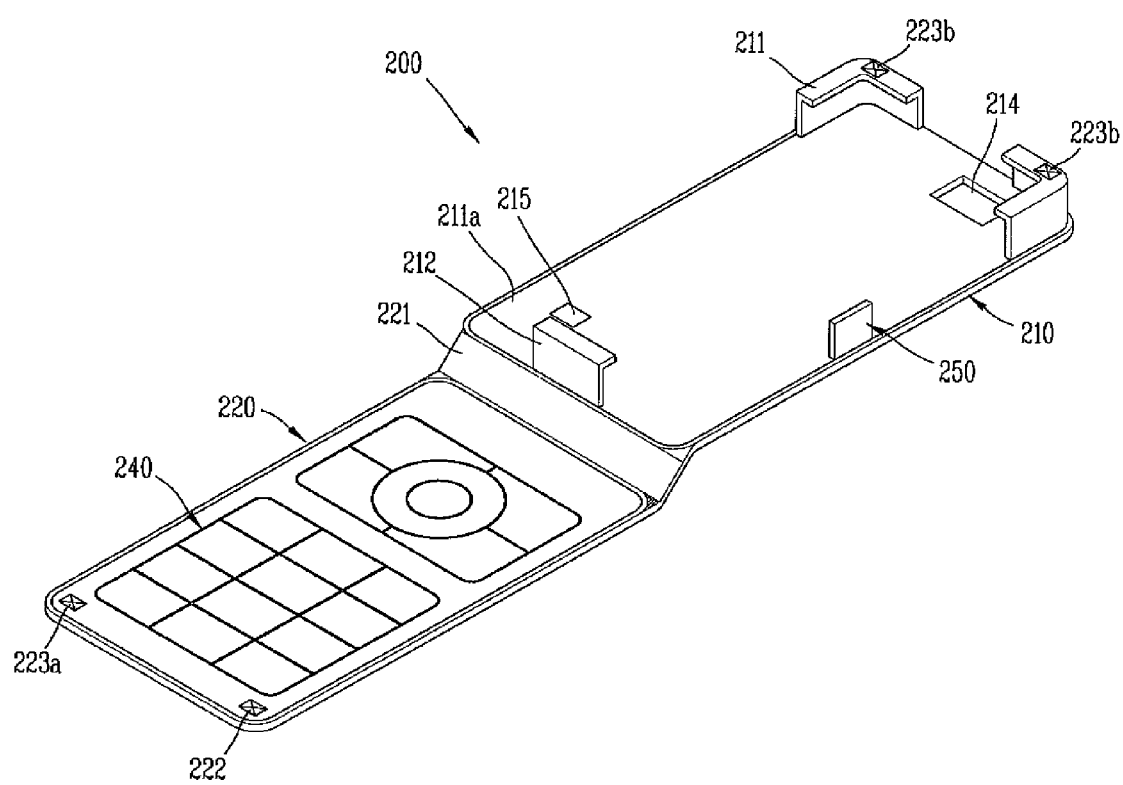
FIG. 2D is a perspective view showing a case to which the mobile terminal is coupled according to a fourth embodiment of the present invention.

As another modification example of the case 200, fixing units 211 and 212 may be provided as shown in FIG. 2D. The first fixing unit 211 may be disposed at a corner of one end of the first body 210, and the second fixing unit 212 may be disposed at a central portion of another end of the first body 210. As shown in FIG. 2A, the first body 210 may be formed of an elastic material that can be deformed, and both ends of the body 110 may be fitted into the fixing units 211 and 212.

The coupling members 223a and 223b may have a configuration shown in FIG. 2C, or may have a configuration shown in FIG. 2A. Therefore, a detailed explanation of the locking members will be omitted.

Figure 2E:
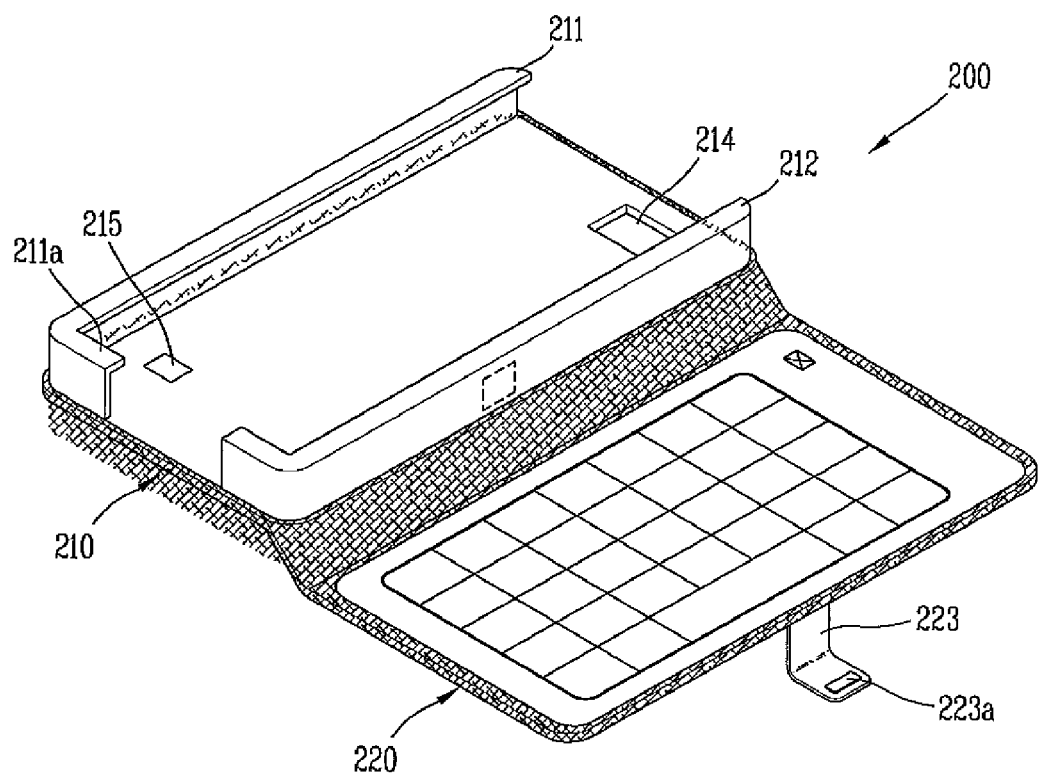
FIG. 2E is a perspective view showing a case to which the mobile terminal is coupled according to a fifth embodiment of the present invention.

As still another modification example of the case 200, as shown in FIG. 2E, the second body 220 may be disposed in a horizontal direction of the first body 210. Here, the manipulating unit 240 of the second body 220 may be configured in a qwerty manner. The fixing units 211 and 212 of FIG. 2E may have a configuration shown in FIG. 2C, and the locking member 223 of FIG. 2E may have a configuration shown in FIG. 2A. Other components of FIG. 2E may have a configuration shown in FIG. 2A, and thus their detailed explanation will be omitted.

The terminal 110 may be detachably mounted at the case 200 as the first body 210 is formed to have a size corresponding to a size of the body 110. The body 110 may be fixed to the case 200 as only one end of the body 110 is received in the case 200, and another one end of the body 110 is fixed by an elastic band, etc.

Figure 4A:
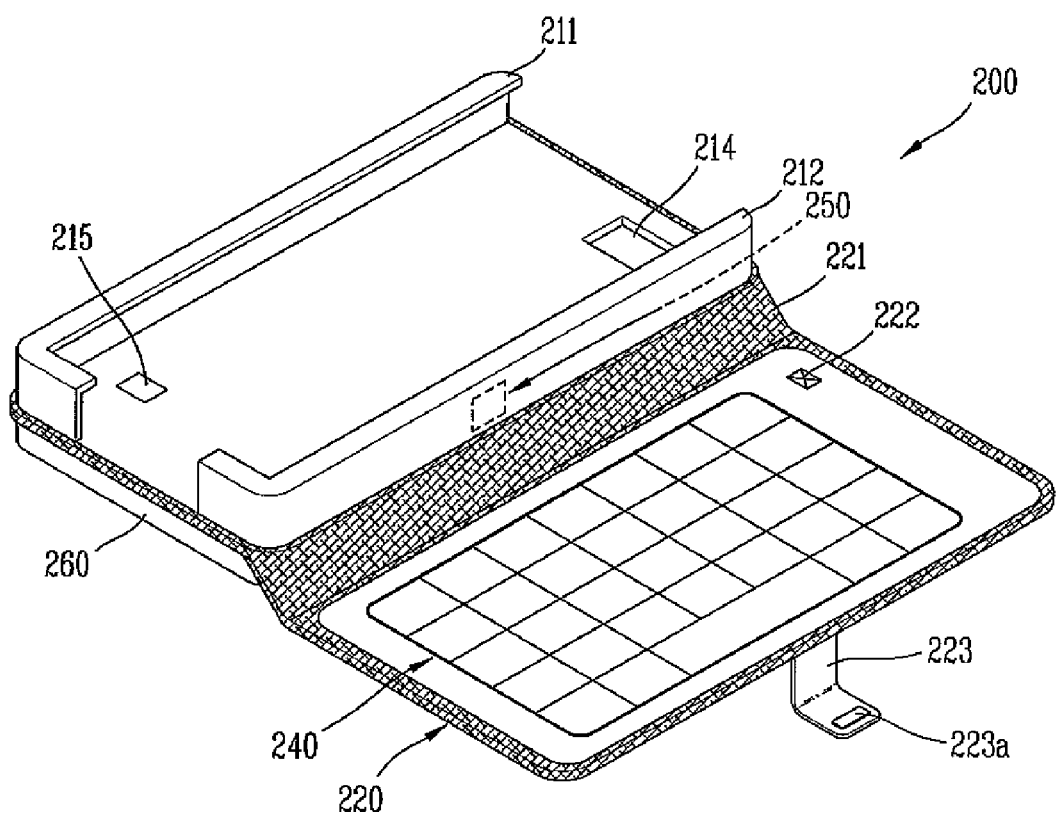
FIG. 4A is a perspective view showing a case having a power supplying unit according to a first embodiment of the present invention.
Figure 4B:
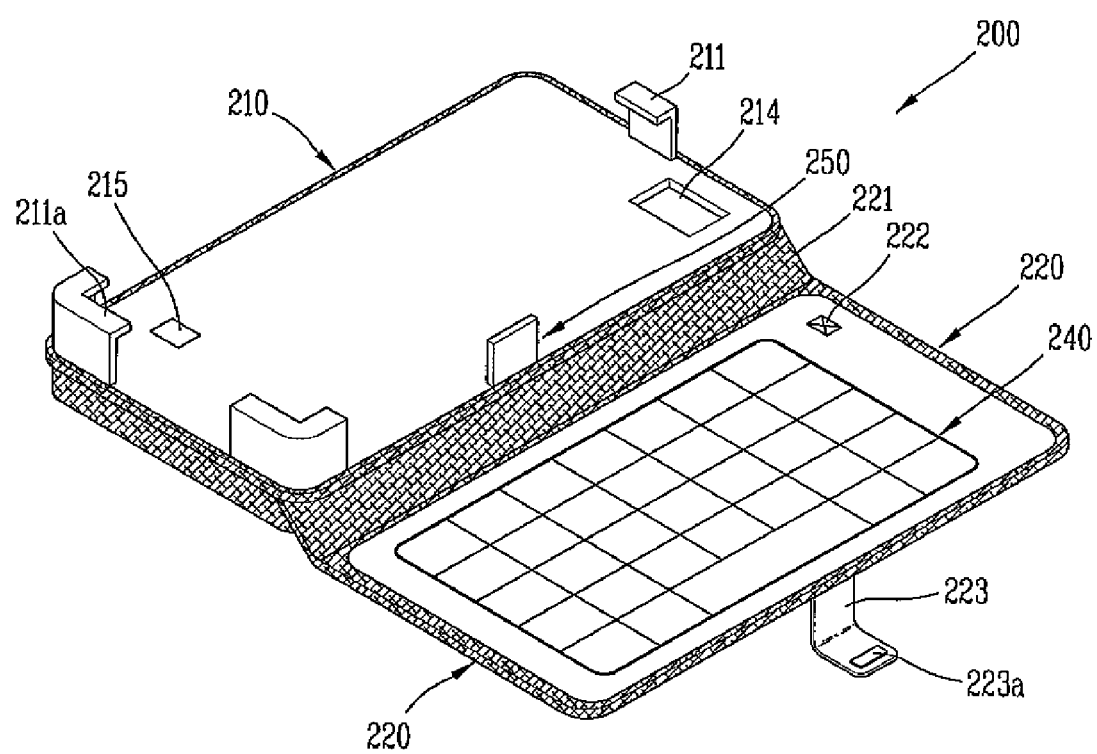
FIG. 4B is a perspective view showing a case having a power supplying unit according to a second embodiment of the present invention.
Figure 4C:
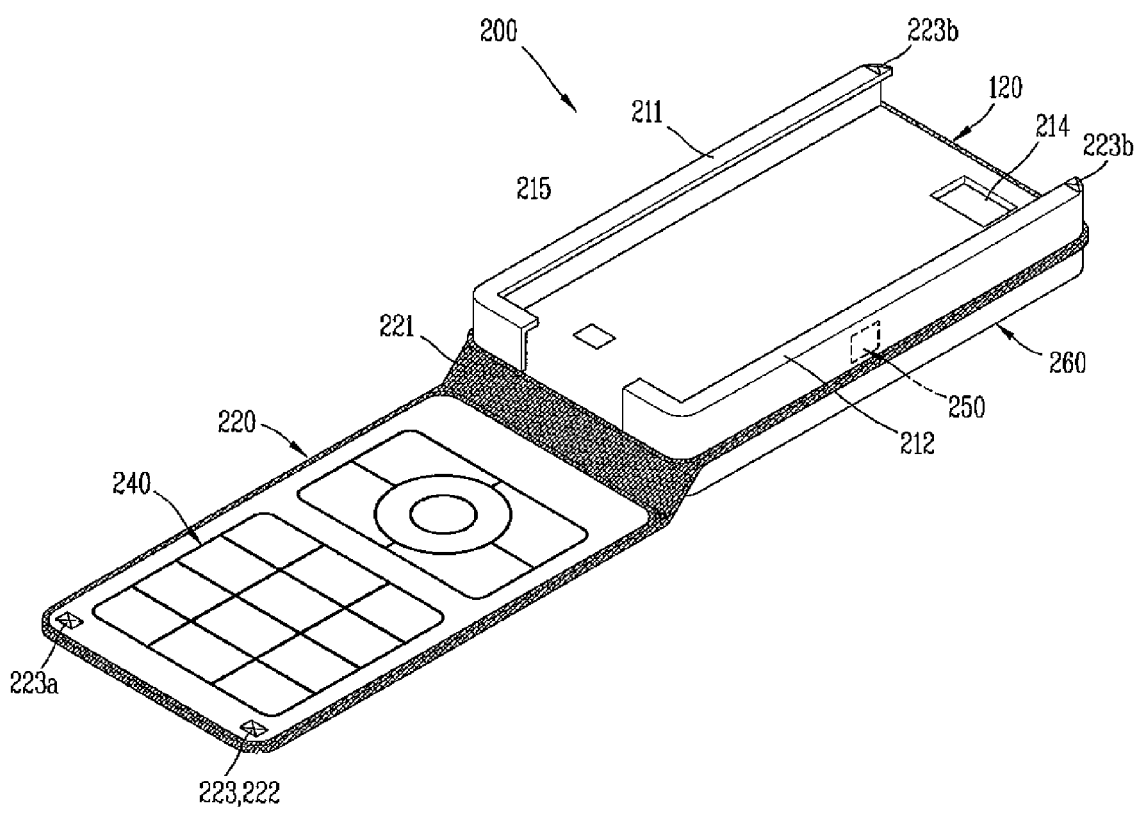
FIG. 4C is a perspective view showing a case having a power supplying unit according to a third embodiment of the present invention.

As yet still another modification of the case 200, as shown in FIGS. 4A to 4C, a power supplying unit 260 may be further provided. The power supplying unit 260 may be provided at the first body 210 where the body 110 is mounted. Here, the power supplying unit 260 may be disposed at a rear surface of the first body 210, that is, an opposite surface to the surface where the body 110 is mounted. A contacting unit 215 for supplying power to the body 110 from the power supplying unit 260 may be provided at the first body 210 of the case 200.

One end of the contacting unit 215 may be connected to the power supplying unit 260 mounted at a rear surface of the first body 210. Another end of the contacting unit 215 may be configured to be exposed to a front surface of the first body 210 thus to be connected to the body 110. The contacting unit 215 may be configured so that a signal can be transmitted between the case 200 and the terminal 100.

As shown in FIG. 2E, the case 200 of FIG. 4A may be configured so that the second body 220 can be disposed in a horizontal direction of the first body 210. Here, the manipulating unit 240 of the second body 220 may be configured in a qwerty manner.

The fixing units 211 and 212 of FIG. 4A may have a configuration shown in FIG. 2C, or the locking member 223 of FIG. 4A may have a configuration shown in FIG. 2A. Other components of FIG. 4A may have a configuration shown in FIG. 2A, and thus their detailed explanation will be omitted.

As shown in FIG. 2E, the case 200 of FIG. 4B may be configured so that the second body 220 can be disposed in a horizontal direction of the first body 210. The fixing units 211 and 212 may be configured so that the first fixing unit 211 can be disposed at a central portion of one end (e.g., an upper end), and the second fixing unit 212 can be disposed at a corner of another end (e.g., a lower end). As shown in FIG. 2A, the first body 210 may be formed of an elastic material that can be deformed, and both ends of the body 110 may be fitted into the fixing units 211 and 212.

As shown in FIG. 2C, the case 200 of FIG. 4C may be configured so that the second body 220 can be extended in a longitudinal direction of the first body 210. The fixing units 211 and 212 may have the configuration shown in FIG. 2C so as to insert the body 110 in one direction. Other components of FIG. 4C may have a configuration shown in FIG. 2A, and thus their detailed explanation will be omitted.

Figure 5A:
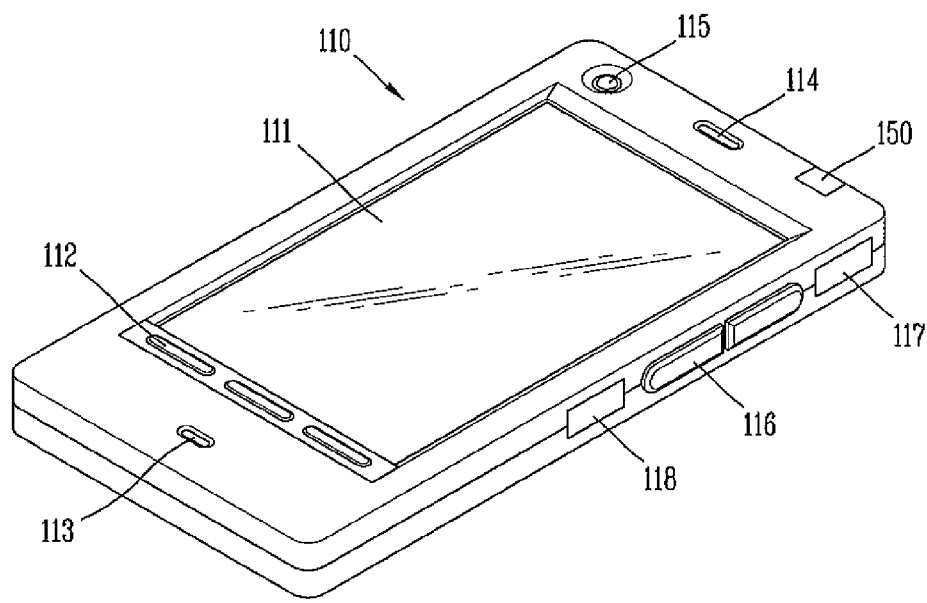
FIG. 5A is a front perspective view showing a mobile terminal having a displaying unit according to a second embodiment of the present invention.
Figure 5B:
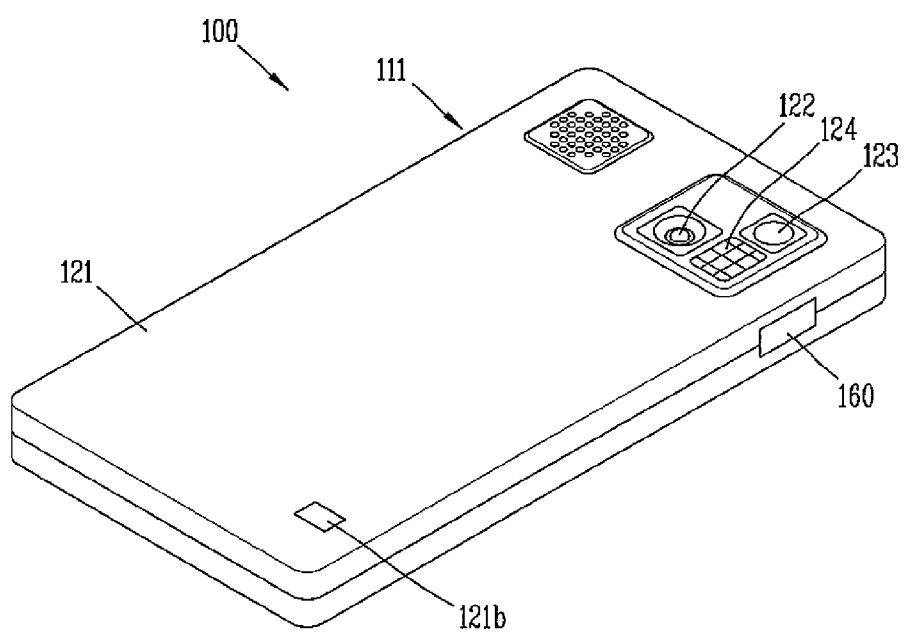
FIG. 5B is a rear perspective view showing the mobile terminal of FIG. 4A.
Figure 6A:
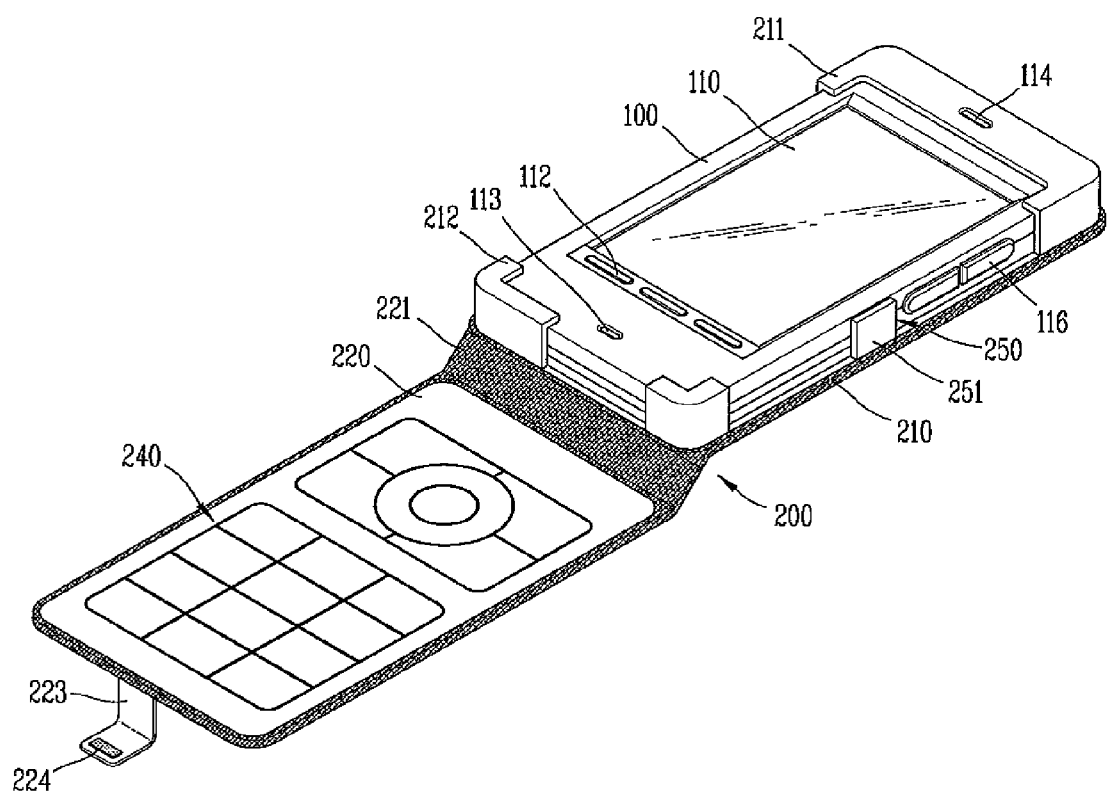
FIG. 6A is a perspective view showing a state that the mobile terminal of a first embodiment is mounted at the case of a first embodiment.
Figure 6B:
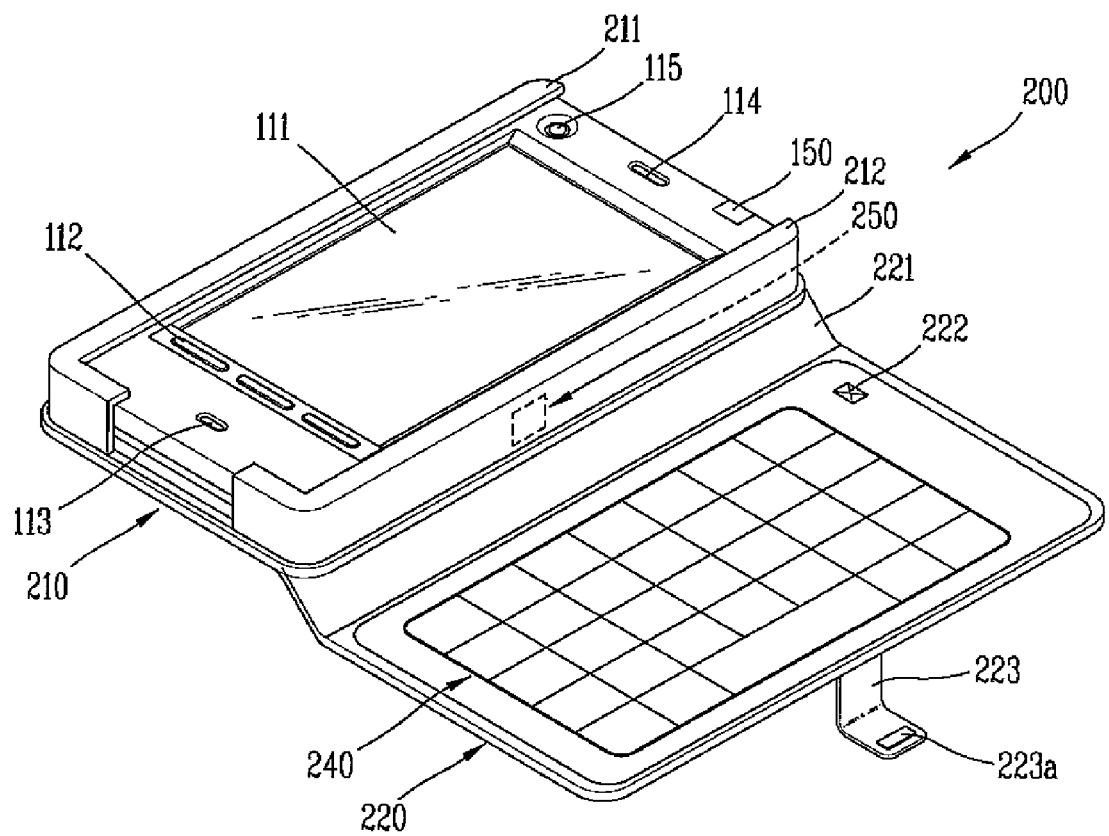
FIG. 6B is a perspective view showing a state that the mobile terminal of a first embodiment is mounted at the case of a second embodiment.

When the power supplying unit 260 is provided at the case 200, as shown in FIGS. 5A and 5B, the mobile terminal 100 may not be provided with the power supplying unit 121. Here, the mobile terminal 100 may be further provided with a contacting unit 121b that can be electrically connected to the contacting unit 215 of the case 200.

Figure 8:
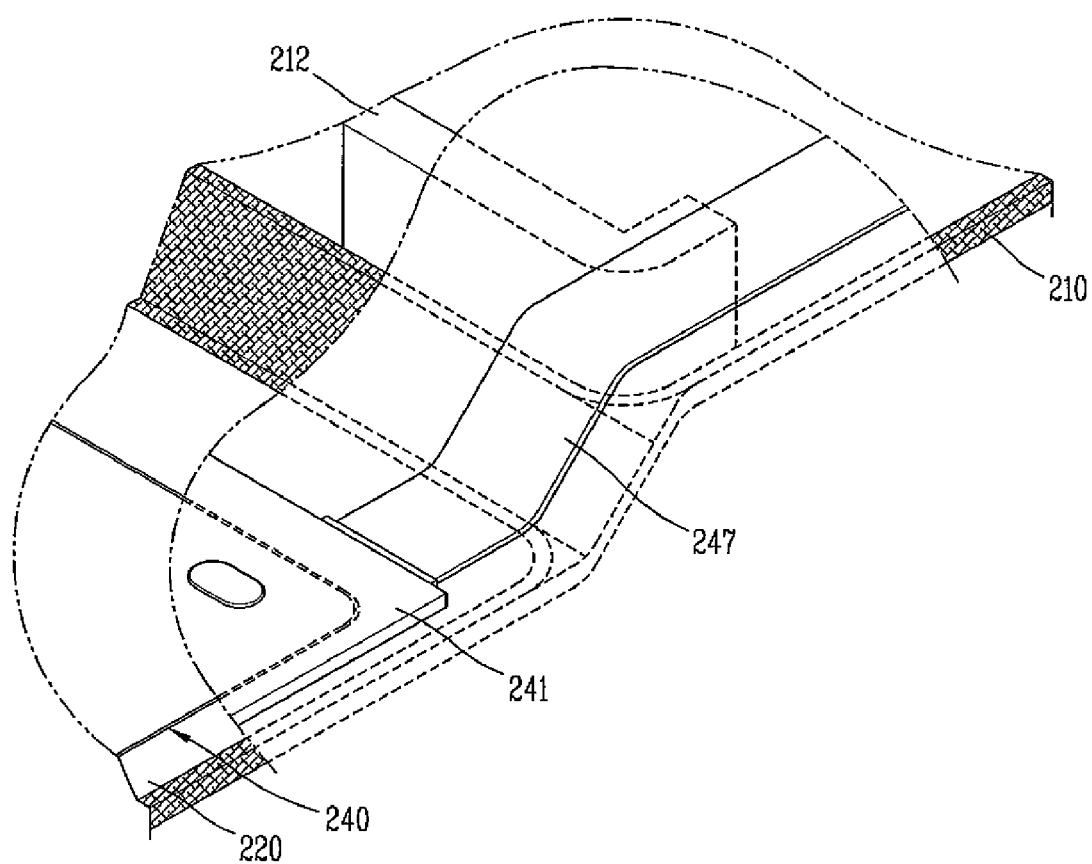
FIG. 8 is a sectional view showing an electric connection state between a first body and a second body of the case according to a second embodiment of the present invention.

As shown in FIG. 8, the case 200 that may have various configurations may include a signal connection member 247 for allowing the signal transception between the first interface 250 of the first body 210 and a manipulating unit 245 of the second body 220. One end of the signal connecting member 247 may be connected to the circuit board 241 having the manipulating unit 240, and another end thereof may be connected to the first interface 250. The signal connection member 247 may transmit a signal generated by the manipulating unit 240 to the first interface 250, thereby performing signal transception between the second interface 118 of the body 110 and the first interface 250 of the case 200.

Figure 9A:
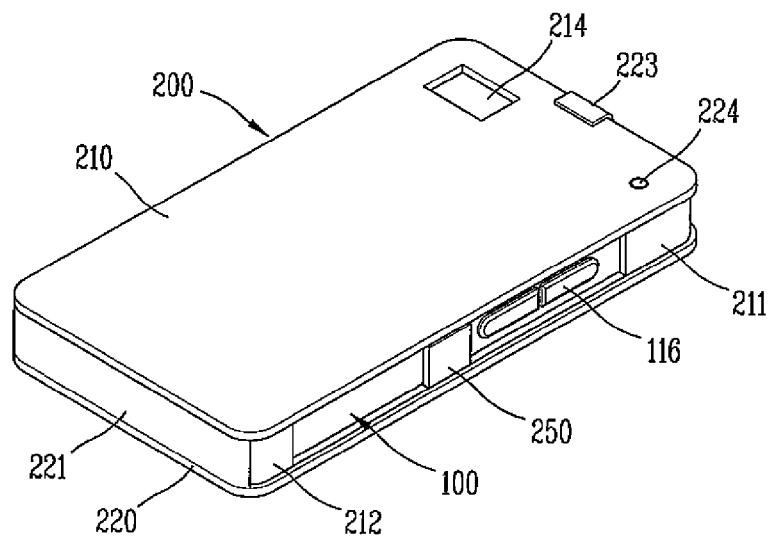
FIG. 9A is a rear perspective view showing a state that the mobile terminal of a first embodiment is mounted at the case of a first embodiment.
Figure 9B:
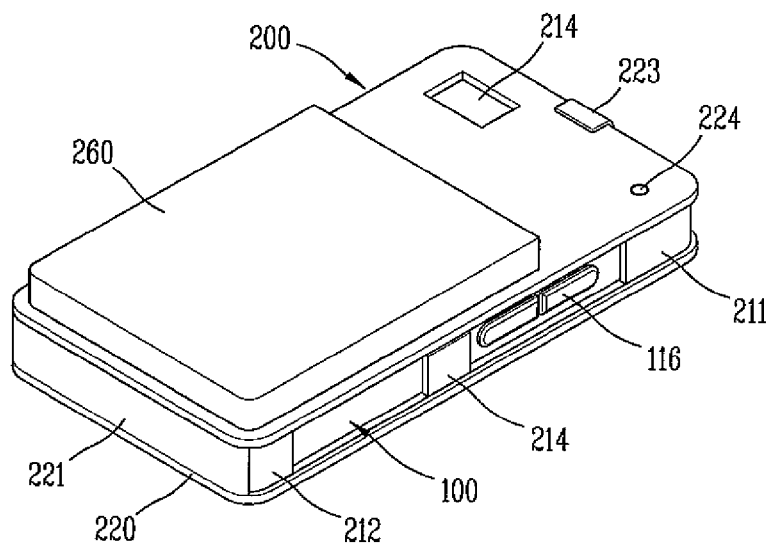
FIG. 9B is a rear perspective view showing a state that the mobile terminal of a first embodiment is mounted at the case of a second embodiment.

FIGS. 9A and 9B show a state that the mobile terminal 100 has been mounted at the case 200 according to the present invention. A light emitting device 224 that emits light according to whether a call has been received may be mounted on an outer surface of the case 200. As shown, the light emitting device 224 is mounted on an outer surface of the case 200 that is in a closed state.

The light emitting device 224 is connected to the circuit board 241 disposed on an inner surface of the case 200. Here, the light emitting device 224 may be connected to the circuit board 241 by an additional connecting member, or by the signal connection member 247. When the case 200 is not provided with a controller 230, and when the manipulating unit 240 and the first interface 250 are controlled by a controller 171 of the body 110, the light emitting device 224 may be connected to the mobile terminal 100 so as to be controlled by the controller 171 of the body 110.

When a call is received, the controller 171 generates a signal and the light emitting device 224 emits light by the signal. Accordingly, when a user is spaced from the mobile terminal 100 enough not to detect a bell sound or vibration, the user can certify whether or not a call has been received through the light emitting device 224.

Figure 10A:
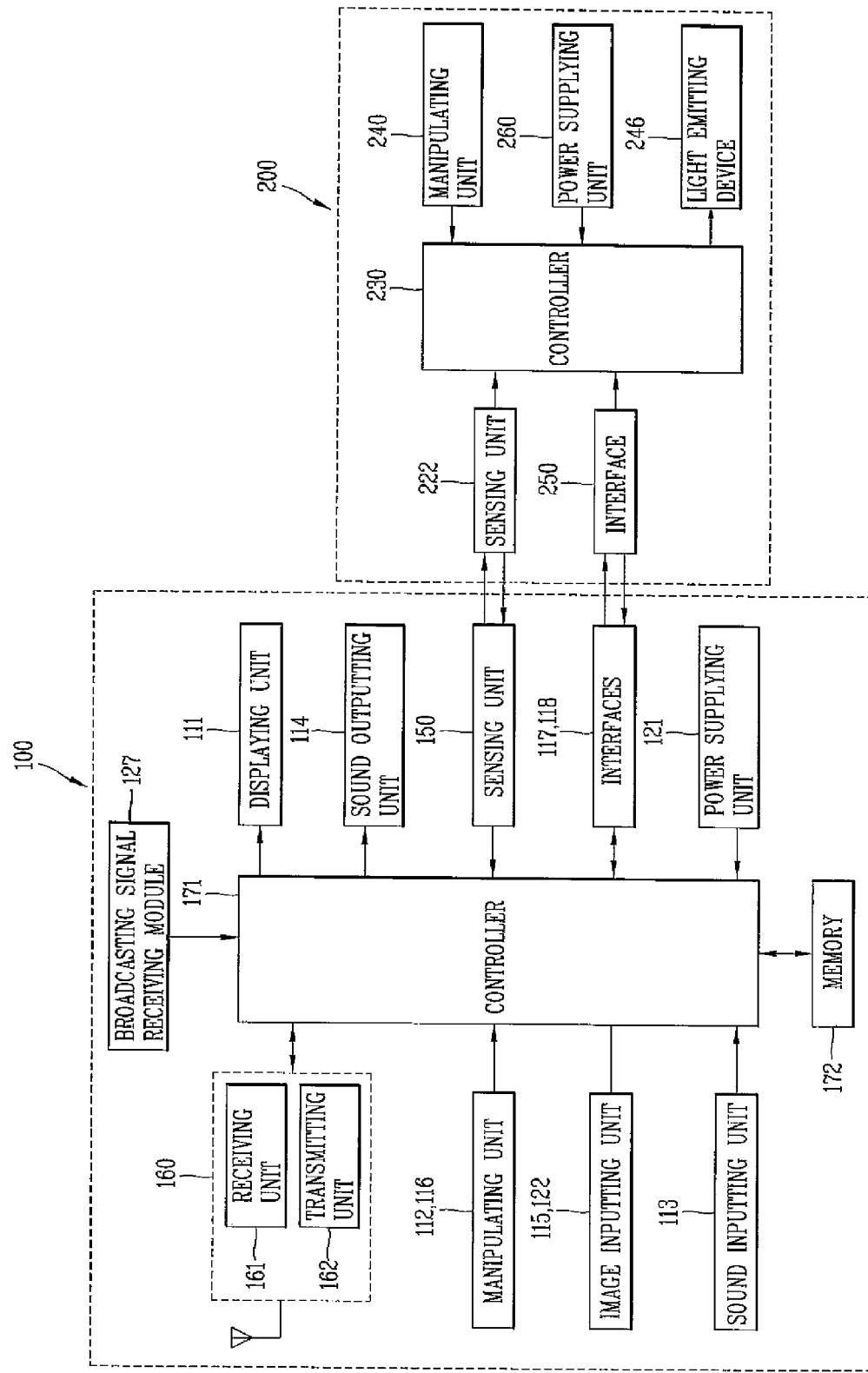
FIG. 10A is a block diagram showing a mobile terminal having the case according to a first embodiment of the present invention.

FIGS. 10A to 10C are block diagrams showing the mobile terminal 100 and the case 200 according to the present invention. The mobile terminal 100 may have following configurations according to its structure or its function mounted therein.

Referring to FIG. 10A, the mobile terminal 100 may include the controller 171 for controlling each function of components. The manipulating units 112 and 116, the image inputting units 115 and 122, the sound inputting unit 113, the sound outputting unit 114, the displaying unit 111, the second interfaces 117 and 118, the sensing unit 150, and/or the power supplying unit 121 may be connected to the controller 171. A wireless communication module 160, a broadcasting signal receiving module 173, and/or a memory 172 may be further connected to the controller 171.

The controller 171 controls an entire operation of the mobile terminal 100. For instance, the controller 171 performs an operation for a voice call, a data communication, a video call, etc. The controller 171 may control an operation mode of the mobile terminal 100 to be automatically converted according to an opened state of the case 200 based on a signal detected by the sensing unit 150. The controller 171 may control information regarding a converted operation mode to be outputted on the displaying unit 111. The controller 171 may control information to be outputted to the displaying unit 111 in a horizontal direction or in a vertical direction according to an opened state of the case 200 or an operation mode.

The controller 171 may control an operation mode for communication or for data input/output according to a signal generated by the manipulating unit 240 of the case 200. For instance, a communication function, information input through the manipulating unit 240 of the case 200, and information output through the displaying unit 111 may be performed. As another example, a communication function may be performed through the manipulating unit 112 of the body 110 and the displaying unit 111, and information input through the manipulating unit 116 of the body 110 and information output through the displaying unit 111 may be performed.

The controller 171 may control information input through one of the manipulating units 112 and 240 and/or the displaying unit 111 not to be allowed, and information input through the manipulating unit 116 to be allowed according to an opened state of the case 200.

When the controller 230 is further provided at the case 200, the controller 171 may control the controller 230, the sensing units 150 and 222, and/or the interfaces 118 and 250 to be inter-worked with one another.

The wireless communication module 160 wirelessly transceives a signal with a base station through an antenna. The wireless communication module 160 transceives voice data, text data, image data and control data under the control of the controller 171. The wireless communication module 160 includes a transceiving unit 162 for transmitting a signal by modulation, and a receiving unit 161 for demodulating a received signal.

The manipulating units 112 and 116 may be disposed as shown in FIGS. 1A and 1B, and provide data inputted by a user for controlling an operation of the terminal to the controller 171.

The image inputting units 115 and 122 transmit information relating to an image to the controller 171 so that a frame of a still image or a moving image obtained by an image sensor in a video calling mode or an image capturing mode can be processed. Then, the image frame processed by the controller 171 is converted into image data thus to be outputted to the displaying unit 111. The converted data may be stored in the memory 172, or may be transmitted outwardly through the transceiving unit 162.

The sound inputting unit 113 receives an external sound signal by a microphone in a calling mode, a recording mode, or a voice recognizing mode, and processes the received signal into electric voice data by the controller 171. In a calling mode, the voice data having been processed is controlled by the controller 171 so as to be converted into a format to be transmitted to a base station through the wireless communication module 160 and then to be outputted to the wireless communication module 160. In a recording mode, the voice data having been processed may be controlled to be stored in the memory 172. The sound inputting unit 113 may be further provided with various noise removing algorithms for removing noise occurred when an external sound signal is inputted.

The sound outputting unit 114 may outwardly output sound data received from the wireless communication module 160 by the controller 171 in a call signal receiving mode, a calling mode, a recording mode, a voice recognizing mode, a broadcasting signal receiving mode, etc., or sound data stored in the memory 172 after a converting process. The sound outputting unit 114 may output a sound signal relating to a function of the mobile terminal (e.g., sound relating to a call signal reception, sound relating to a message reception, etc.). The sound outputting unit 114 may include a speaker, a receiver, a buzzer, etc.

The displaying unit 111 displays information processed in the mobile terminal. For instance, in a calling mode, the displaying unit 111 outputs a UI (User Interface) or a GUI (a Graphic User Interface) relating to a call by the controller 171. In a video calling mode or an image capturing mode, the displaying unit 111 outputs a captured image or UI or GUI by the controller 171. The displaying unit 111 may be configured to perform data input as well as data output. Here, data inputted through the displaying unit 111 may be transmitted to the controller 171 thus to be controlled for an operation corresponding to the inputted information. The transmitted information may be displayed on the displaying unit 111.

The sensing unit 150 may generate a sensing signal for controlling an operation of the mobile terminal after detecting a current situation of the mobile terminal such as an opened state of the case 200, a position of the mobile terminal, and a user's contact. When the mobile terminal 100 is mounted at the case 200, the sensing unit 150 senses whether the case 200 has been opened, and outputs a detected result to the controller 171 thereby to control an operation of the mobile terminal. The sensing unit 150 may further perform a function relating to whether power has been supplied from a power supplying unit 127, or whether the interface 126 has been coupled to an external device.

The second interfaces 117 and 118 perform an interface with all external devices connected to the mobile terminal such as a wire/wireless headset, an external charger, a wire/wireless data port, and a card socket (e.g., a memory card, SIM/UIM card). The second interfaces 117 and 118 may receive data from the external devices or receive power under control of the controller 171 thus to transmit to each component inside the mobile terminal. The interfaces may transmit data inside the mobile terminal to the external devices. The second interface 118 performs a communication with the first interface 250 of the case 200.

The memory 172 may store a program of the controller 171, or may temporarily store data to be inputted/outputted (e.g., a phone book, a message, a still image, a moving image, etc.). The memory 172 includes a hard disc, a card type memory (e.g., an SD memory or an XD memory), a flash memory, a RAM, a ROM, etc.

The broadcasting signal receiving module 173 receives a broadcasting signal transmitted through a satellite wave, an earth wave, etc. Then, the broadcasting signal receiving module 173 converts the broadcasting signal into broadcasting data that can be outputted to the sound outputting unit 114 and the displaying unit 111, thereby outputting to the controller 171. The broadcasting signal receiving module 173 receives additional data relating to broadcasting such as an EPG (Electronic Program Guide) and a channel list. Broadcasting data and additional data converted by the broadcasting signal receiving module 173 may be stored in the memory 172.

The power supplying unit 121 receives internal or external power under control of the controller 171, and supplies the received power to each component.

The case 200 may further comprise the controller 230 that inter-works with the controller 171 of the mobile terminal 100, and may further comprise the sensing unit 222, the first interface 250, the manipulating unit 240, the power supplying unit 260, and the light emitting devices 224 and 246.

The controller 230 inter-works with the controller 171 of the mobile terminal 100 thus to transmit a signal generated by the manipulating unit 240. The controller 230 controls an operation of each component of the case 200 such as the first interface 250, the sensing unit 222, and the light emitting devices 224 and 246.

The sensing unit 222 detects whether the case 200 has been opened by inter-working with the sensing unit 150 of the case 100, and transmits a detected signal to the controller 171 of the mobile terminal and/or the controller 230 of the case 200. Accordingly, the sensing unit 222 controls an operation of the mobile terminal according to whether the case 200 has been opened.

The first interface 250 transmits a signal generated by the manipulating unit 240 to the mobile terminal by inter-working with the second interface 118 of the mobile terminal 100. The first interface 250 may receive a control signal from the controller 171 of the mobile terminal.

FIG. 10B shows the mobile terminal 100 and the case 200 that have the same configuration as those of FIG. 10A except that the power supplying unit 260 is not provided at the case 200. Here, the case 200 may receive power from the mobile terminal 100.

FIG. 10C shows the mobile terminal 100 and the case 200 that have the same configuration as those of FIG. 10A except that the power supplying unit 121 is not provided at the mobile terminal 100. Here, the mobile terminal 100 may receive power from the case 200.

Under a state that the mobile terminal 100 is mounted at the case 200, a signal generated by the manipulating unit 240 of the case 200 is transmitted to the mobile terminal as shown in FIG. 10.

A method for controlling the mobile terminal will be explained with reference to FIG. 10 and FIG. 11 is a flowchart showing a method for controlling a mobile terminal according to a first embodiment of the present invention.

Under a state that the mobile terminal 100 is mounted at the case 200, the manipulating unit 240 of the case 200 is activated (S1).

The manipulating unit 240 may be activated to be operated (e.g., a signal generation) by the controller 171 of the mobile terminal 100 and/or the controller 230 of the case 200. Here, control signals may be generated by the controllers 171 and 230 according to input signals by the manipulating units 112 and 116 of the mobile terminal 100. The control signals may be generated by the controllers 171 and 230 according to an opened state of the case 200. That is, the controllers 171 and 230 may generate control signals based on a signal detected by an interaction between the sensing unit 150 of the mobile terminal 100 and the sensing unit 222 of the case 200, thereby activating the manipulating unit 240.

Here, the signal may be detected by the sensing units 150 and 222 based on a magnetic strength, or an operation signal of each sensor.

In order to operate the controller 230 of the case 200 and/or the manipulating unit 240, power may be supplied from the power supplying unit 121 of the mobile terminal 100 and/or the power supplying unit 260 of the case 200. Here, power may be supplied by interacting each component for activating the manipulating unit 240. The first and second interfaces 118 and 250 may be initialized or activated together with the activation of the manipulating unit 240. For instance, when the first and second interfaces 118 and 250 are implemented as antennas for the near distance communication, frequency signals processed by signal processing modules of the first and second interfaces 118 and 250 may be synchronized with each other.

Once the manipulating unit 240 is activated, it is checked whether or not an input signal is generated by the manipulating unit 240 (S2). The check may be performed by the controller 171 of the mobile terminal 100 and/or the controller 230 of the case 200.

If an input signal has not been generated by the manipulating unit 240 in step S2, the activation of the manipulating unit is maintained so as to continue the check. On the contrary, if an input signal has been generated by the manipulating unit 240, the input signal is transmitted to the controller 171 of the mobile terminal 100 (S3). As aforementioned, the input signal is transmitted to the controller 171 of the mobile terminal 100 as the first interface 250 of the case 200 interacts with the second interface 118 of the mobile terminal 100.

Once the input signal is transmitted to the controller 171, an operation of the mobile terminal 100 is controlled or information is outputted to the displaying unit 111 based on the transmitted input signal (S4). The step S4 may be performed even when only one of the mobile terminal 100 and the case 200 has the controller. In order to operate the mobile terminal 100 and/or to output information to the displaying unit 111, the controller 171 may process the transmitted input signal.

When a signal is generated by the manipulating unit 240 or the manipulating unit 240 is activated, the light emitting device 246 of the manipulating unit 240 may be controlled to emit light. As a result, the manipulating unit 240 may be operated even in a dark place.

Then, the manipulating unit 240 of the case 200 is non-activated (S5). The step S5 may be performed according to input signals by the manipulating units 112, 116 and 240 of the mobile terminal 100 and/or according to an operated state of the case 200, which is similar to the step S1. On the contrary, when the manipulating units 112, 116 and 240 or other components of the mobile terminal 100 are not operated for a certain time, the manipulating unit 240 may be automatically non-activated.

Here, power more than a certain level may be supplied to the case 200 so as to operate the light emitting device 246 of the case 200.

When the body 100 is received in the case 200, a user may set an input mode by which it can be checked whether information is inputted through one of a key-inputting unit on the displaying unit 110, the manipulating units 112 and 116 of the mobile terminal 100, and the manipulating unit 240 of the case 200, or through all of them. For instance, since the body 110 and the case 200 are connected to each other and a menu for setting an input mode is displayed on the displaying unit 111, the user can set an input mode to be used.

Accordingly, the user can protect the mobile terminal 100 from an external impact by using the case 200, or can certify each kind of contents through a wide entire region of the displaying unit 111 with using the manipulating unit 240 of the case 200.

The present invention may provide a mobile terminal, comprising: a body; a case coupled to the body, and having a user input unit at one side thereof; a first interface positioned on the case, for transmitting the input signal generated by the user input unit; a second interface positioned on the body, for receiving the transmitted input signal from the first interface of the case; and a controller positioned on the body, for controlling an operation or output information of the mobile terminal by using the input signal from the first interface of the case, wherein the case may further comprise a first body for detachably coupling the body of the mobile terminal, a second body foldably coupled to the first body, for covering one surface of the body, a sensing unit for determining whether the case has been opened or not, the case also includes a controlling unit for controlling the first interface and/or second interface to be turned ON/OFF the case is provided with one or more power supplies generated from at least one of an external power supplying unit, a power supplying unit of the mobile terminal and its own power supplying unit at the case where the one or more provided power supplies to the case are supported or controlled by automatically or a user setting information the first and second interfaces are configured each other so that the input signal and/or a power supply can be transmitted between the body and the case, at least one or more contacting units are included in the case and/or the body for providing a power supply to the case from a power supplying unit of the mobile terminal, the user input unit of the case is at least one of a pressure switch and a touch pad, the user input unit is implemented in a qwerty manner with implementation of a light emitting device, the input signal transmitted from the first interface is converted by using the controller of the body or a controller of the case, and the case includes its own power supplying unit at the case, the power supplying unit of the case provides a power supply to a power supplying unit of the body, and the body and the case are configured to be detachable from each other.

It can be also said that the present invention provides a case for a mobile terminal, comprising: a user input unit disposed at least one side of the case; a controller for manipulating an input signal generated by the user input unit; and an interface for transmitting the manipulated input signal by the controller, wherein the case comprises: a first body for coupling the body of the mobile terminal; a second body foldably coupled to the first body to cover one surface of the body of the mobile terminal, and having a user input unit at a surface contacting the body of the mobile terminal, the case is provided with one or more power supplies generated from at least one of an external power supplying unit, a power supplying unit of the mobile terminal and its own power supplying unit at the case, the first and second interfaces are configured each other so that the input signal and/or a power supply can be transmitted between the body and the case, at least one or more contacting units are included in the case and/or the body for providing a power supply to the case from a power supplying unit of the mobile terminal, the case is provided with a sensing unit that determines whether the case has been opened for operating the mobile terminal, and the user input unit is implemented in a qwerty manner, and a light emitting device is further implemented with the user input unit.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A case for a mobile terminal, comprising:
a first body for detachably coupling a body of the mobile terminal;
a second body foldably coupled to the first body to cover at least one surface of the body of the mobile terminal, wherein a user input unit is disposed on the second body of the case in order to receive an input signal by a user; and
an interface for transmitting the input signal received by the user input unit, wherein the interface of the case is disposed on the first body of case, wherein the transmitted input signal is received through an interface of the mobile terminal, and wherein the transmitted input signal is used for an operation of the mobile terminal.

2. The case for the mobile terminal of claim 1, wherein the case is provided with one or more power supplies generated from at least one of an external power supplying unit, a power supplying unit of the mobile terminal and a power supplying unit of the case.

3. The case for the mobile terminal of claim 2, wherein the one or more provided power supplies to the case are controlled by automatically or a user setting information.

4. The case for the mobile terminal of claim 1, wherein the interface of the case and the interface of the mobile terminal are configured each other so that the input signal and/or a power supply can be transmitted between the body of the mobile terminal and the case.

5. The case for the mobile terminal of claim 1, further comprising:

at least one or more contacting units for providing a power supply to the case from a power supplying unit of the mobile terminal.

6. The case for the mobile terminal of claim 1, further comprising:

a sensing unit for determining whether the case has been opened or not.

7. The case for the mobile terminal of claim 1, wherein the user input unit is implemented in a qwerty manner.

8. The case for the mobile terminal of claim 1, wherein the user input unit is implemented with a light emitting device.

9. The case for the mobile terminal of claim 1, wherein the user input unit is implemented with at least one of a pressure switch and a touch pad.

10. The case for the mobile terminal of claim 1, further comprising:

a controlling unit for controlling the first interface and/or second interface to be turned ON/OFF.

11. The case for the mobile terminal of claim 1, further comprising:

a power supplying unit of the case provides a power supply to a power supplying unit of the body.

* * * * *